(12) United States Patent
Cohen

(10) Patent No.: US 6,744,647 B2
(45) Date of Patent: Jun. 1, 2004

(54) PARALLEL CONNECTED CONVERTERS APPARATUS AND METHODS USING SWITCHING CYCLE WITH ENERGY HOLDING STATE

(75) Inventor: Isaac Cohen, Dix Hills, NY (US)

(73) Assignee: Lambda Electronics, Inc., Plainview, NY (US)

( * ) Notice: Subject to any disclaimer, the term of this patent is extended or adjusted under 35 U.S.C. 154(b) by 0 days.

(21) Appl. No.: 10/121,916

(22) Filed: Apr. 12, 2002

(65) Prior Publication Data

US 2003/0021130 A1 Jan. 30, 2003

Related U.S. Application Data

(60) Provisional application No. 60/295,865, filed on Jun. 4, 2001.

(51) Int. Cl.[7] .............................................. H02H 7/122
(52) U.S. Cl. .............................. 363/71; 363/72; 363/50; 363/55
(58) Field of Search ............................. 363/70, 71, 50, 363/55, 72

(56) References Cited

U.S. PATENT DOCUMENTS

| | | | |
|---|---|---|---|
| 4,618,919 A | * 10/1986 | Martin, Jr. ............... | 363/21.12 |
| 5,291,382 A | 3/1994 | Cohen | |
| 5,508,903 A | * 4/1996 | Alexndrov .................. | 363/16 |
| 5,796,595 A | * 8/1998 | Cross ......................... | 363/71 |
| 5,844,787 A | 12/1998 | Fraidlin et al. | |
| 6,285,568 B1 | 9/2001 | Taurand | |

OTHER PUBLICATIONS

Unitrode, "Low Power, Dual Output, Current Mode PWM Controller," SLUS272A, Feb. 2000 pp.1–7.
Viswanathan et al., "Tri–State Boost Converter with No Right Half Plane Zero," PEDS '01 Conference Proceedings, 2001, pp. 1–7.

* cited by examiner

*Primary Examiner*—Shawn Riley
(74) *Attorney, Agent, or Firm*—Myers Bigel Sibley & Sajovec

(57) ABSTRACT

A power converter apparatus includes an input port and an output port. First and second inductors are coupled to the output port. A first switching circuit is coupled to the input port and the first inductor. The first switching circuit is operative to repetitively perform a cycle including a first state in which the first switching circuit couples the first inductor to the input port such that energy is transferred from the input port to the first inductor, a second state in which the first switching circuit short circuits the first inductor, and a third state in which the first switching circuit decouples the first inductor such that energy is transferred from the first inductor to the output port. A second switching circuit is coupled to the input port and the second inductor and implements a similar cycle. The second switching circuit may operate such that the first and second states of the second switching circuit substantially coincide with the third state of the first switching circuit. Related methods are also described.

35 Claims, 25 Drawing Sheets

PARALLEL CONNECTED CONVERTERS APPARATUS AND METHODS USING SWITCHING CYCLE WITH ENERGY HOLDING STATE

RELATED APPLICATION

This application claims the benefit of the U.S. Provisional Application Serial No. 60/295,865, entitled Switching Power Converter Apparatus and Methods Using Switching Cycle with Energy Holding State, to Cohen, filed Jun. 4, 2001, which is hereby incorporated by reference as if set forth herein in its entirety.

BACKGROUND OF THE INVENTION

The present invention relates to power conversion apparatus and methods, and more particularly, to switching power converter apparatus and methods of operation thereof.

DC-to-DC power conversion is commonly achieved using switching power converter circuits. Switching power converter circuits often include one or more switching elements that selectively couple a DC power source to an inductor, such as the primary winding of a transformer, such that the inductor is periodically charged and discharged to produce DC output voltage. The DC output voltage may be regulated by controlling the switching frequency and/or duty cycle of the switching elements.

A common type of switching converter is the isolated flyback converter. A typical isolated flyback converter includes a switching circuit that is operative to apply a voltage across a primary winding of a transformer to develop a current in the primary winding in an "on" phase. After lapse of a time interval, the switching circuit then open circuits the primary winding in an "off" phase. During the off phase, a voltage is induced on the secondary winding of the transformer, causing a current to flow to a storage capacitor via rectifying action of an output diode coupled to the secondary winding. The switching circuit may have different configurations, including single-ended configuration and double-ended configurations. An example of a double-ended configuration is described at pp. 139–140 of *Switching Power Supply Design*, by Pressman, $2^{nd}$ ed. (1998). Another type of DC/DC converter circuit using a three-part conversion cycle is described in U.S. Pat. No. 6,285,568 to Taurand.

Although conventional flyback converters may be effective, there is an ongoing need for improved power converter designs that have properties desirable for output paralleling and other applications.

SUMMARY OF THE INVENTION

In some embodiments of the invention, a power converter apparatus comprises an input port and an output port. A first inductor is coupled to the output port. A first switching circuit is coupled to the input port and the first inductor, and is operative to repetitively perform a cycle comprising a first state in which the first switching circuit couples the first inductor to the input port such that energy is transferred from the input port to the first inductor, a second state in which the first switching circuit short circuits the first inductor, and a third state in which the first switching circuit decouples the first inductor such that energy is transferred from the first inductor to the output port. A second inductor is coupled to the output port. A second switching circuit is coupled to the input port and the second inductor, and is operative to repetitively perform a cycle comprising a first state in which the second switching circuit couples the second inductor to the input port such that energy is transferred from the input port to the second inductor, a second state in which the second switching circuit short circuits the second inductor, and a third state in which the second switching circuit decouples the second inductor such that energy is transferred from the second inductor to the output port. The second switching circuit may operate such that the first and second states of the second switching circuit substantially coincide with the third state of the first switching circuit.

According to further embodiments of the invention, a multi-phase power converter apparatus includes an input port and an output port. The apparatus also includes a first transformer having a primary winding and a secondary winding, and a first switching circuit coupled to the input port and the primary winding of the first transformer. The first switching circuit is operative to repetitively perform a cycle including a first state in which the first switching circuit couples the input port to first and second terminals of the primary winding of the first transformer, a second state in which the first switching circuit couples the first terminal of the primary winding of the first transformer to the second terminal of the primary winding of the first transformer, and a third state in which the first switching circuit decouples at least one of the first and second terminals of the primary winding of the first transformer from the input port while decoupling the first and second terminals of the primary winding of the first transformer from one another.

The apparatus also includes a second transformer having a primary winding and a second winding, and a second switching circuit coupled to the input port and the primary winding of the second transformer. The second switching circuit is operative to repetitively perform a cycle including a first state in which the second switching circuit couples the input port to first and second terminals of the primary winding of the second transformer, a second state in which the second switching circuit couples the first terminal of the primary winding of the second transformer to the second terminal of the primary winding of the second transformer, and a third state in which the switching circuit decouples at least one of the first and second terminals of the primary winding of the second transformer from the input port while decoupling the first and second terminals of the primary winding of the second transformer from one another. An output circuit is coupled to the secondary windings of the first and second transformers and is operative to transfer energy to the output port from the secondary windings of the first and second transformers as the first and second switching circuits cyclically operate.

In still other embodiments of the invention, a power converter apparatus includes an input port and an output port. The apparatus further includes a transformer having a primary winding and a secondary winding, and a switching circuit coupled to the input port and to the primary winding. The switching circuit is operative to cyclically apply a voltage to the primary winding from the input port and to then decouple the primary winding to induce a voltage across the secondary winding. An output circuit is coupled to the secondary winding and operative to transfer energy to the output port from the secondary winding as the switching circuit cyclically transitions. The apparatus further includes a clamp circuit coupled to the primary winding and operative to limit a voltage developed across the primary winding when the primary winding is decoupled. The clamp circuit further includes a clamp voltage generator circuit operative to produce a clamp voltage output node thereof, the clamp voltage between a voltage at a first terminal of the input port and a voltage at the second terminal of the input port, and a current control circuit, e.g., a diode, coupled between the primary winding and the output node of the clamp voltage generator circuit.

Embodiments of the invention can provide several advantages over conventional flyback and other switching converter configurations. For example, by using a power conversion cycle including a "short circuit" interval in which energy is stored in an inductor, an additional degree of freedom can be provided over that provided by conventional "two-state" switching converter circuits. This additional degree of freedom can allow for relatively simple implementation of multi-phase converters, including multiphase converters with self-driven output synchronous rectifier circuits. The invention may be embodied as apparatus and methods.

DETAILED DESCRIPTION OF EMBODIMENTS

Figure 1:
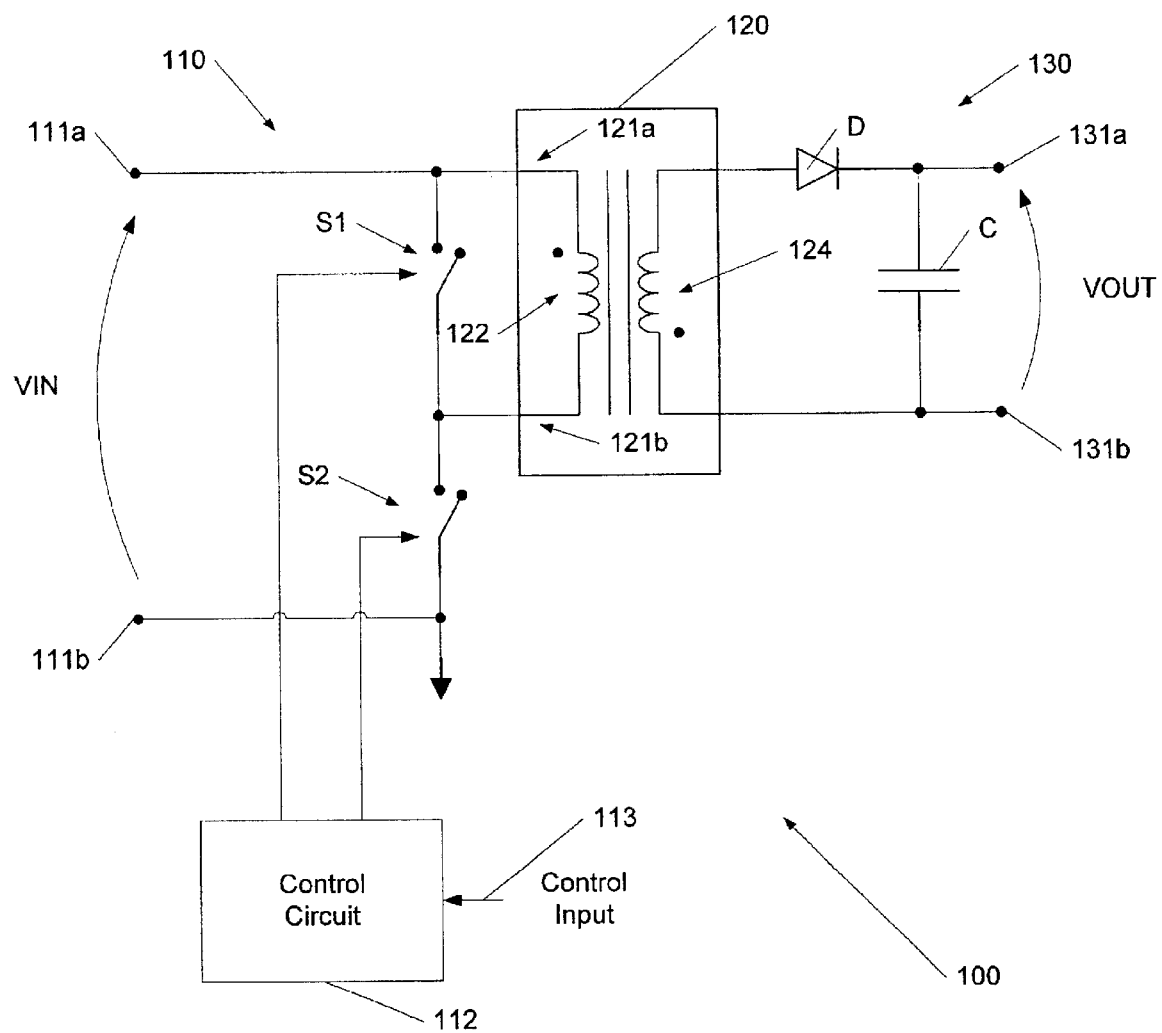
FIG. 1 is a schematic diagram illustrating a power converter apparatus according to embodiments of the invention.

Specific embodiments of the invention now will be described more fully with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements. It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The following description relates to power converter apparatus and related methods, and more particularly, DC—DC power converter apparatus and methods. It will be appreciated that such apparatus and methods may be implemented in a variety of different types of equipment including, but not limited to, standalone power supplies, power supplies integrated into electronic equipment such as computers, telecommunications devices, and the like, and uninterruptible power supplies (UPSs). It will be appreciated that, in general, power converter apparatus and methods according to embodiments of the invention may be implemented using discrete electronic components (e.g., discrete transistors, capacitors, transformers, inductors, and the like), integrated circuit (IC) devices, (such as controller ICs, transistor array ICs, and the like) and combinations thereof.

FIG. 1 illustrates a power converter apparatus 100 according to embodiments of the invention. Generally, the power converter apparatus 100 produces an output voltage VOUT at an output port 131a, 131b from an input voltage VIN at an input port 111a, 111b. The apparatus 100 includes a switching circuit 110 coupled to the input port 111a, 111b and to a transformer 120. In particular, the switching circuit 110 includes a first switch S1 (e.g., a MOSFET, IGBT or other semiconductor switching device) coupled to first and second terminals 121a, 121b of a primary winding 122 of the transformer 120 and to a first terminal 111a of the input port 111a, 111b. The switching circuit 110 further includes a second switch S2 (e.g., a MOSFET, IGBT or other semiconductor switching device) coupled between the second terminal of the primary winding 122 and the second terminal 111b of the input port 111a, 111b.

The apparatus 100 further includes an output circuit 130 coupled to a secondary winding 124 of the transformer 120. The output circuit 130 is operative to transfer energy from the secondary winding 124 to the output port 131a, 131b as the switching circuit 110 operates, thus producing an output voltage VOUT. As shown, the output circuit 130 includes a rectifier circuit including a diode D and a capacitor C.

The switching circuit 110 also includes a control circuit 112 that is operative to control the switches S1, S2 responsive to a control input 113. In particular, it will be understood that the first and second switches S1, S2 may be controlled independently, i.e., responsive to respective control inputs.

For example, the first switch S1, S2 may be controlled responsive to selected ones of the output voltage VOUT, the input voltage VIN, and other state variables associated with the converter apparatus 100. As described in greater detail below with reference to FIG. 2, the switch S1 provides the converter apparatus with the ability to introduce a "holding" state in a three-state flyback conversion cycle. The switch S1 can thus, for example, provide the converter apparatus 100 with an additional degree of freedom in controlling the output voltage VOUT, in comparison to conventional flyback converter operations.

It will be appreciated that the converter apparatus 100 may be implemented in a number of different circuit configurations, including circuit configurations and components other than those illustrated in FIG. 1. For example, although the switching circuit 110 of FIG. 1 includes switches S1, S2 as shown, other switching circuit configurations that provide equivalent functionality are within the scope of the invention. It will be appreciated that the invention also applied to configurations in which multiple secondary windings 124 and accompanying output circuits 130 are driven from a single primary winding 122. Moreover, although a transformer-isolated flyback converter configuration is illustrated in FIG. 1, the invention is also applicable to other converter configurations, including, but not limited to, non-isolated flyback converter configurations, isolated and non-isolated boost converter configurations, and isolated and non-isolated buck converter configurations. In addition, the output circuit 130 may include configurations other than the rectifier configuration illustrated in FIG. 1, for example, configurations, such as synchronous rectifier configurations, that use active switching devices (e.g., transistors).

Figure 2:
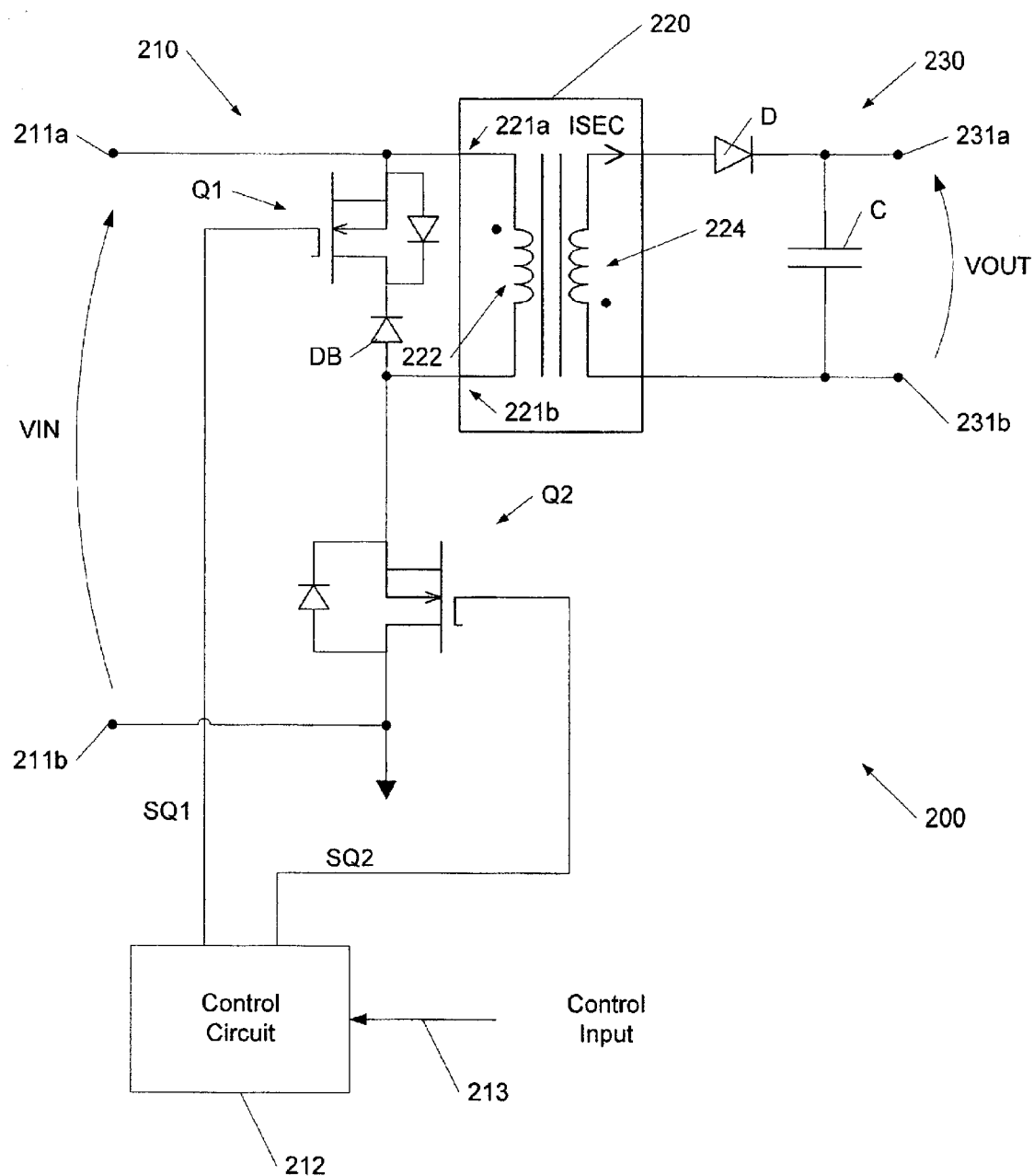
FIG. 2 is a schematic diagram illustrating a flyback converter apparatus according to other embodiments of the invention.

FIG. 2 illustrates an exemplary power converter apparatus 200 according to some embodiments of the invention, in which input switching for a transformer 220 is provided by transistors Q1, Q2. The apparatus 200 includes a switching circuit 210 coupled to an input port 211a, 211b and to the transformer 220. In particular, the switching circuit 210 includes a first transistor Q1 coupled to first and second terminals 221a, 221b of a primary winding 222 of the transformer 220 and to a first terminal 211a of the input port 211a, 211b. The switching circuit 210 further includes a second transistor Q2 coupled between the second terminal 221b of the primary winding 222 and a second terminal 211b of the input port 211a, 211b. The switching circuit 210 also includes a control circuit 212 that is operative to provide drive signals SQ1, SQ2 to transition the transistors Q1, Q2 between "on" and "off"(conducting and non-conducting) states responsive to a control input 213. A blocking diode DB is connected in series with the first transistor Q1 to prevent short-circuiting of the primary winding when the second transistor Q2 is "on." It will be understood that such a blocking diode or similar device may only be necessary if the switching device, here shown as a transistor Q1, lacks a reverse blocking capability. It will be further appreciated that the blocking diode DB can allow for simplified operation of the transistors Q1, Q2, as described in detail below.

As shown, the apparatus 200 further includes an output circuit 230 having a configuration like that of the output circuit 130 illustrated in FIG. 1, detailed discussion of which will be omitted in light of the preceding description of FIG. 1. The output circuit 230 is operative to transfer energy from a secondary winding 224 of the transformer to an output port 231a, 231b as the switching circuit 210 operates.

Figure 3:
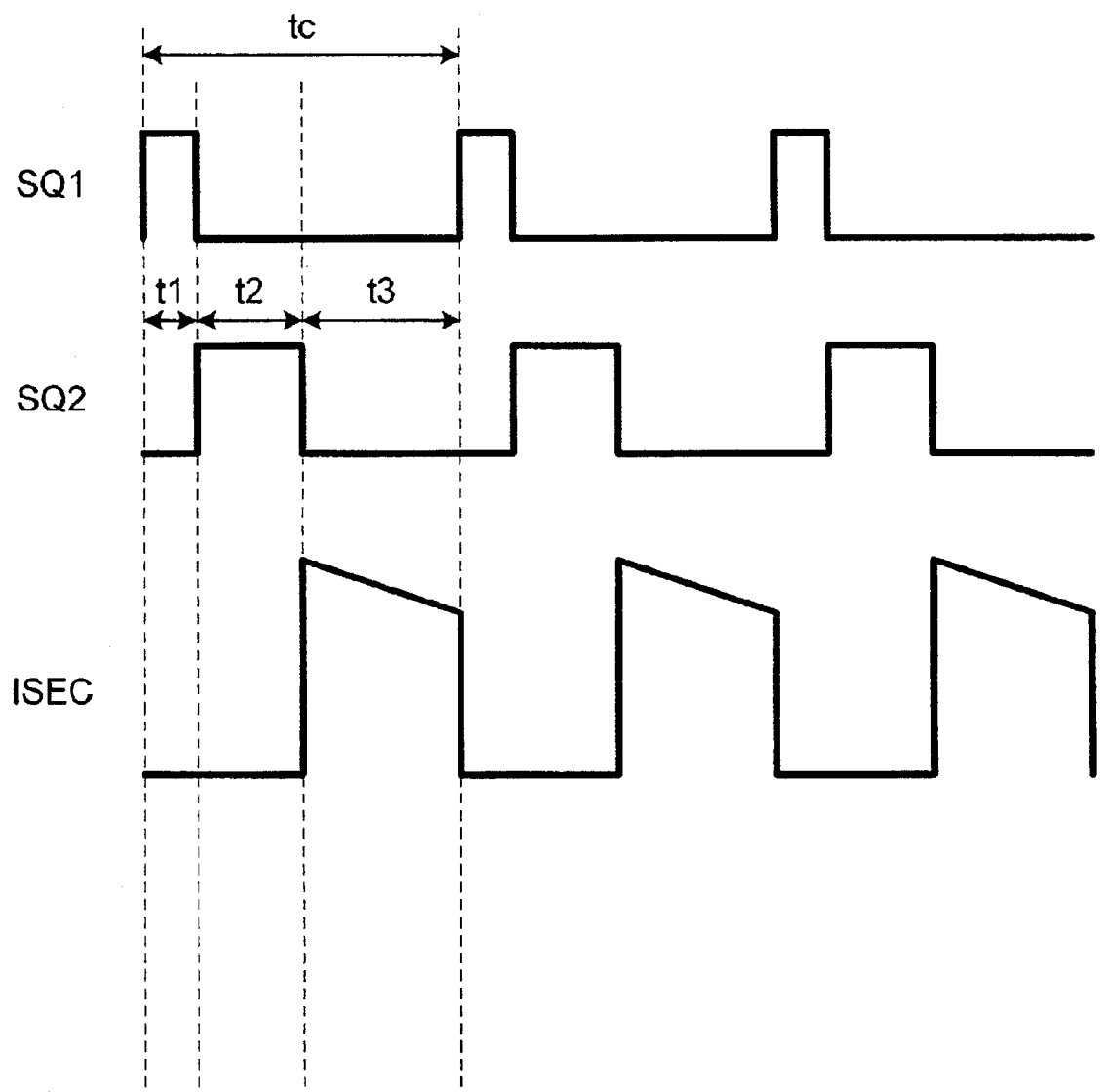
FIGS. 3 and 4 are waveform diagrams illustrating exemplary operations for the apparatus of FIG. 2.

Exemplary operations of the apparatus 200 of FIG. 2 according to embodiments of the invention will now be described with reference to FIGS. 3 and 4. Referring to FIG. 3, the apparatus 200 is operative to repetitively perform a power conversion cycle having a duration tc. For a first time interval t1, the drive signal SQ1 is asserted, turning the first transistor Q1 on and short-circuiting the primary winding 222 of the transformer 220, i.e., providing a low impedance across the primary winding 222 such that the voltage across the primary winding 222 is held near zero volts. In a succeeding interval t2, the first drive signal SQ1 is deasserted, turning the first transistor Q1 off, while the second drive signal SQ2 is asserted, causing a voltage VIN at the input port 211a, 211b to be applied across the primary winding 222 of the transformer 220. During this time interval t2, current in the primary winding ramps up as the inductance of the primary winding 222 is charged.

In a succeeding interval t3, both of the drive signals SQ1, SQ2 are deasserted, turning both of the transistors Q1, Q2 off, and creating an open-circuit condition for the primary winding 222. This causes a voltage to be developed on the secondary winding 224 of the transformer 220, such that the diode D in the output circuit 230 becomes forward biased. This allows a current ISEC to flow from the secondary winding 224 to the output capacitor C and/or a load (not shown) coupled to the output port 231a, 231b, producing a voltage VOUT at the output port 231a, 231b.

As shown in FIG. 3, the secondary current ISEC gradually decays over the interval t3 until the cycle of operation recommences when the first drive signal SQ1 is again reasserted, turning on the first transistor Q1 and shorting the primary winding 222. This causes the secondary current ISEC to again drop towards zero. The intervals t1, t2, t3 may be cyclically repeated, such that the secondary current ISEC is pulsed, as shown in FIG. 3.

Figure 4:
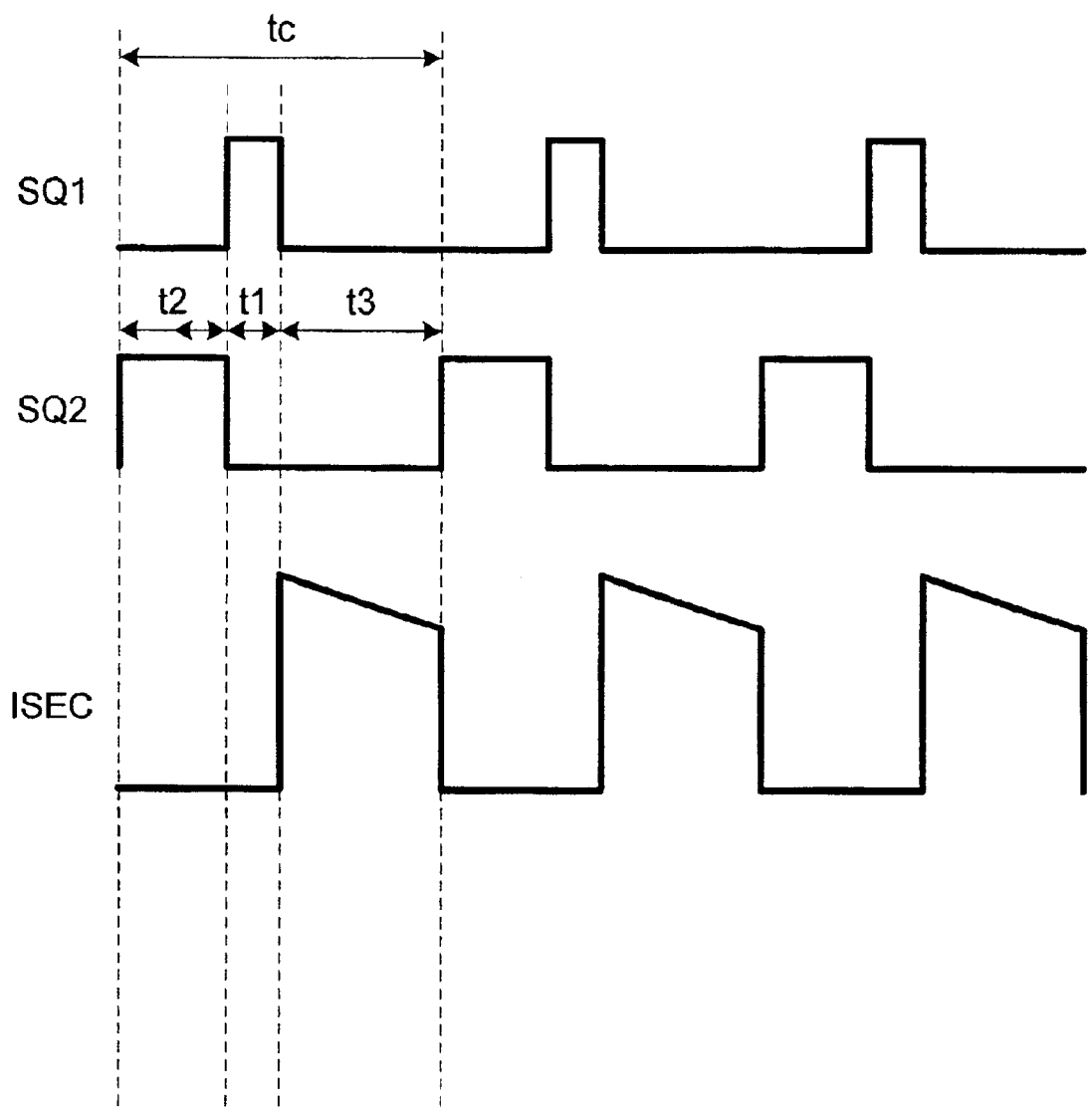

As shown in FIG. 4, the order of the intervals t1, t2, t3 may be varied within the scope of the invention. In particular, FIG. 4 illustrates exemplary operations of the converter apparatus 200 with the "short circuit" and "charging" intervals t1 and t2 in reverse order in comparison to the order illustrated in FIG. 3. During the interval t2, the first drive signal SQ1 is deasserted, turning the first transistor Q1 off, while the second drive signal SQ2 is asserted, causing the voltage VIN at the input port 211a, 211b to be applied across the primary winding 222 of the transformer 220. During this time interval t2, current in the primary winding ramps up as the inductance of the primary winding 222 is charged. During a succeeding interval t1, the drive signal SQ1 is asserted, turning the first transistor Q1 on and short-circuiting the primary winding 222 of the transformer 220. This causes the voltage on the secondary winding 224 to drop towards zero.

In a succeeding interval t3, both of the drive signals SQ1, SQ2 are deasserted, turning both of the transistors Q1, Q2 off, and creating an open-circuit condition for the primary winding 222. This causes a voltage to be developed on the secondary winding 224 of the transformer 220 such that the diode D in the output circuit 230 becomes forward biased. This allows a current ISEC to flow from the secondary winding 224 to the output capacitor C and/or a load (not shown) coupled to the output port 231a, 231b.

As with the operations shown in FIG. 3, the secondary current ISEC gradually decays over the interval t3 until the cycle of operation recommences when the second drive signal SQ1 is again asserted, turning on the second transistor Q2. This causes the secondary current ISEC to again drop to zero as current builds up in the primary winding 222. The sequence t2, t1, t3 may be cyclically repeated, producing a pulsed secondary current ISEC, as shown in FIG. 4.

It will be appreciated that the operations of FIGS. 3 and 4 can be varied within the scope of the invention. For example, as discussed above, the presence of the blocking diode DB in series with the transistor Q1 can allow for an alternative operation. In particular, instead of deasserting the first drive signal SQ1 during the "charging" intervals t2 to turn off Q1, both of the drive signals SQ1, SQ2 can be asserted during the charging interval t2, as the reverse block action of the diode DB acts to prevent current flow though the transistor Q1 while the transistor Q2 is on.

According to aspects of the invention, the relative durations of the "short circuit" and "charging" intervals t1, t2 can be varied to control the output voltage VOUT. For example, for a continuous conduction mode of operation (i.e., operation such that the current in the secondary winding 224 during the interval t3 is not allowed to fall to zero before transition to the next state t1), the output voltage VOUT may be determined as follows:

$$VOUT = \frac{VIN}{N} * \frac{t1}{t3}, \qquad (1)$$

where N is the turns ratio of the transformer 220. Defining:

$$D1 = \frac{t1}{tc}, \qquad (2)$$

and $$D2 = \frac{t3}{tc}, \qquad (3)$$

equation (1) can be expressed as:

$$VOUT = \frac{VIN}{N} * \frac{D1}{D2}. \qquad (4)$$

Figure 5:
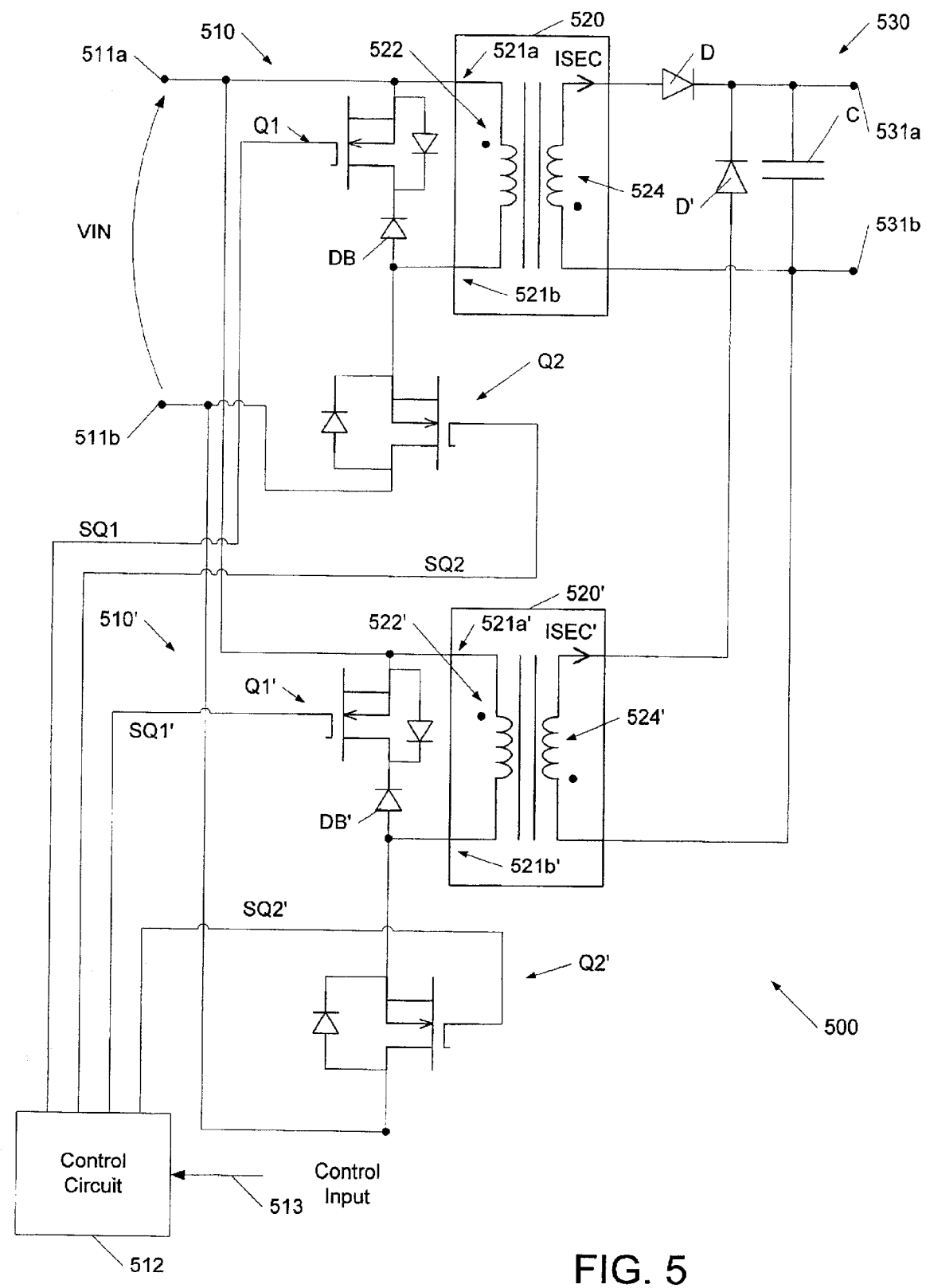
FIG. 5 is a schematic diagram illustrating a multi-phase flyback converter apparatus according to other embodiments of the invention.

According to other embodiments of the invention, converter circuits with a flyback operation cycle including a short-circuited energy holding state, such as that described above with reference to FIG. 2, may be advantageously used in creating multi-phase converters that can provide low output ripple and other desirable characteristics. For example, as shown in FIG. 5, a power converter apparatus 500 according to embodiments of the invention includes first and second transformers 520, 520' first and second switching circuits 510, 510' having configurations similar to the switching circuit 210 of FIG. 2. The first switching circuit 510 includes first transistor Q1 coupled to a first terminal 511a of an input port 511a, 511b and to first and second terminals 521a, 521b of a primary winding 522 of the first transformer 520. The first switching circuit 510 further includes a second transistor Q2 coupled between the second terminal 521b of the primary winding 522 and the second terminal 511b of the input port 511a, 511b. A blocking diode DB is connected in series with the first transistor Q1 to prevent short-circuiting of the primary winding 522 when the second transistor Q2 is "on." The transistors Q1, Q2 operate responsive to drive signals SQ1, SQ2 produced by a control circuit 512.

Similarly, the second switching circuit 510' includes a first transistor Q1' coupled to the first terminal 511a' of the input port 511a, 511b and to first and second terminals 521a', 521b' of a primary winding 522' of the second transformer 520'. The second switching circuit 510' further includes a second transistor Q2' coupled between the second terminal 521b' of the primary winding 522' and the second terminal 511b of the input port 511a, 511b. A blocking diode DB' is connected in series with the first transistor Q1' to prevent short circuiting of the primary winding 522' when the second transistor Q2' is "on." The transistors Q1', Q2' operate response to drive signals SQ1', SQ2' produced by the control circuit 512 responsive to a control input 513.

Secondary windings 524, 524' of the transformers 520, 520' are coupled to an output port 531a, 531b by an output circuit 530. As shown, the output circuit 530 includes first and second diodes D1, D1' that control currents ISEC, ISEC' delivered to a capacitor C and/or a load (not shown) at an output port 531a, 531b.

Figure 6:
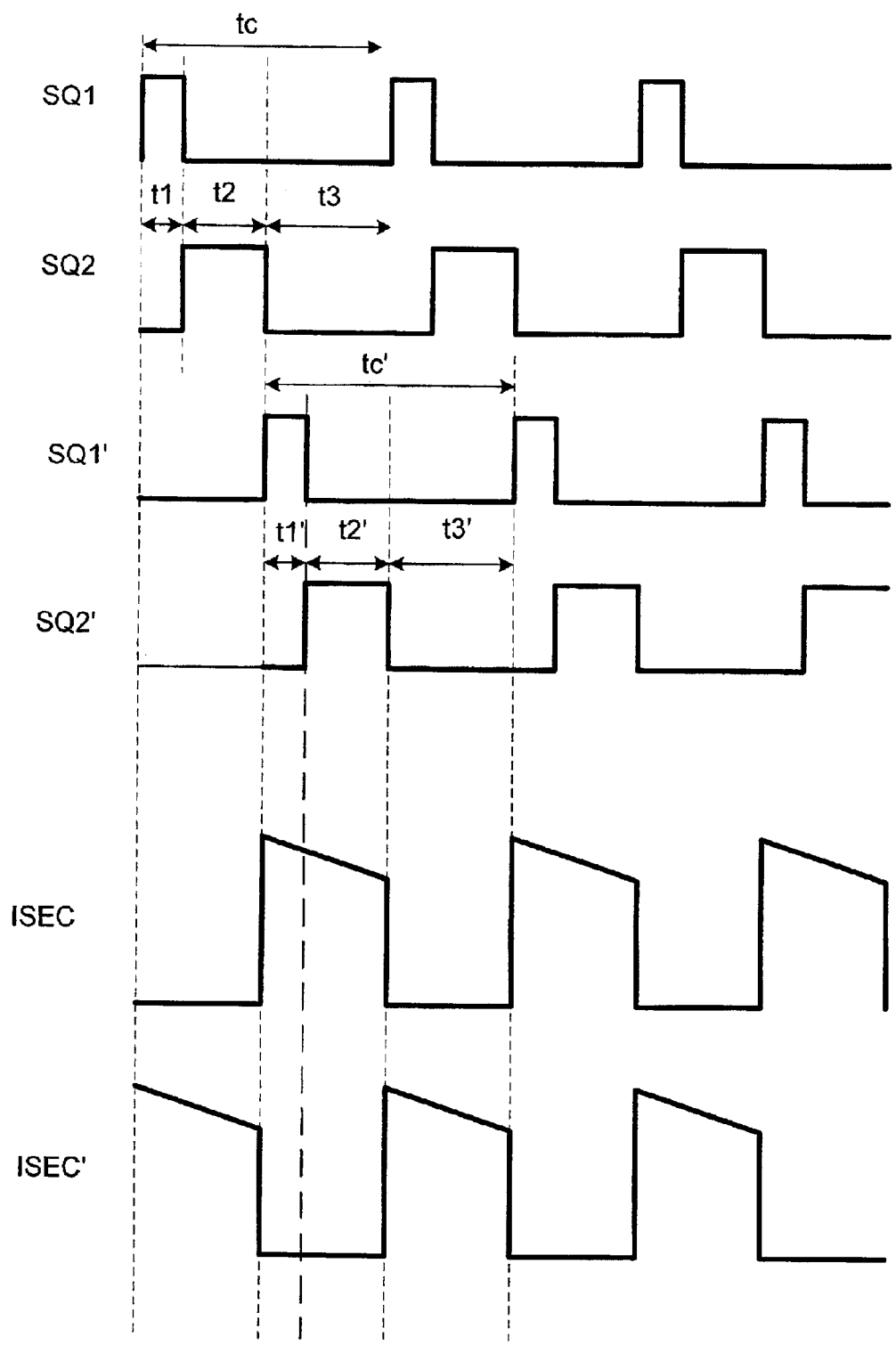
FIG. 6 is a waveform diagram illustrating exemplary operations for the apparatus of FIG. 5.

Exemplary operations of the converter apparatus 500 of FIG. 5 will now be explained with reference to FIG. 6. The drive signals SQ1, SQ2 of the first switching circuit 510 are generated to provide a cycle tc including three intervals t1, t2, t3. In the interval t1, the drive signal SQ1 is asserted, turning the transistor Q1 on and short-circuiting the primary winding 522 of the first transformer 520. In the succeeding interval t2, the drive signal SQ1 is deasserted, turning the transistor Q1 off, while the second drive signal SQ2 is asserted, causing the voltage VIN at the input port 511a, 511b to be applied across the primary winding 522 of the first transformer 520. During this time interval t2, current in the primary winding 522 ramps up as the inductance of the primary winding 522 is charged.

In the succeeding interval t3, both of the drive signals SQ1, SQ2 are deasserted, turning both of the transistors Q1, Q2 off, and creating an open-circuit condition for the primary winding 522. This causes a voltage to be developed on the secondary winding 524 of the first transformer 520, such that the diode D in the output circuit 530 becomes forward biased. This allows a current ISEC to flow from the secondary winding 524 of the first transformer 520 to the output capacitor C and/or a load (not shown) coupled to the output port 531a, 531b. As shown in FIG. 6, the secondary current ISEC gradually decays over the interval t3 until the cycle of operation recommences when the drive signal SQ1 is again reasserted, turning on the transistor Q1 and shorting the primary winding 522 of the first transformer 520. This causes the secondary current ISEC to again drop toward zero.

The second switching circuit 510' is operated in a similar fashion, except that the cycle tc' of the second switching circuit 510' is shifted approximately 180 degrees with respect to the cycle tc of the first switching circuit. In particular, operation of the second switching circuit 520 is shifted such that the "open circuit" interval t3 of the first switching circuit 510 coincides with "charging" and "short circuit" intervals t1', t2' of the second switching circuit 520', and such that an "open circuit" interval t3' of the second switching circuit 510' coincides with the "charging" and "short circuit" intervals t1, t2 of the first switching circuit 520. As a result, pulses in the secondary current ISEC' produced in the secondary winding 524' of the second transformer 520' are shifted 180 degrees with respect to pulses of current ISEC produced in the secondary winding 524 of the first transformer 520. As such, the combined current delivered to the output port 531a, 531b can be approximately constant, with relatively low ripple.

It will be understood that the multi-phase operation described above with reference to FIGS. 5 and 6 can be generalized to combinations of more than two phases. For example, three switching circuits controlling input to three transformers arranged in parallel as in FIG. 2 may have their operations phased such that the "open circuit" interval of each switching circuit coincides with the "charging" and "short circuit" intervals for the other two switching circuits. The converters need not be identical.

As noted above, switching circuits for controlling input to a transformer of a power converter according to embodiments of the invention may have a variety of configurations. According to embodiments of the invention shown in FIG. 7, a power converter apparatus 700 includes a switching circuit 710 including a first transistor Q1 coupled between a first terminal 711a of an input port 711a, 711b and a first terminal 721a of a primary winding 722 of a transformer 720, and a second transistor Q2 coupled between a second terminal 711b of the input port 711a, 711b and a second terminal 721b of the primary winding 722. The switching circuit 710 further includes a first diode D1 coupled between the second input terminal 711b and the first terminal 721a of the primary winding 722, and a second diode D2 coupled between the first input terminal 711a and the second terminal 721b of the primary winding 722. The first and second transistors Q1, Q2 operate responsive to drive signals SQ1, SQ2 generated by a control circuit 712 responsive to a control input 713. A secondary winding 724 of the transformer 720 is coupled to an output port 731a, 731b by an output circuit 730. The output circuit 730 has the same configuration of the output circuit 230 illustrated in FIG. 2 and, in light of the foregoing discussion of FIG. 2, further discussion of the output circuit 730 will not be provided.

Figure 7:
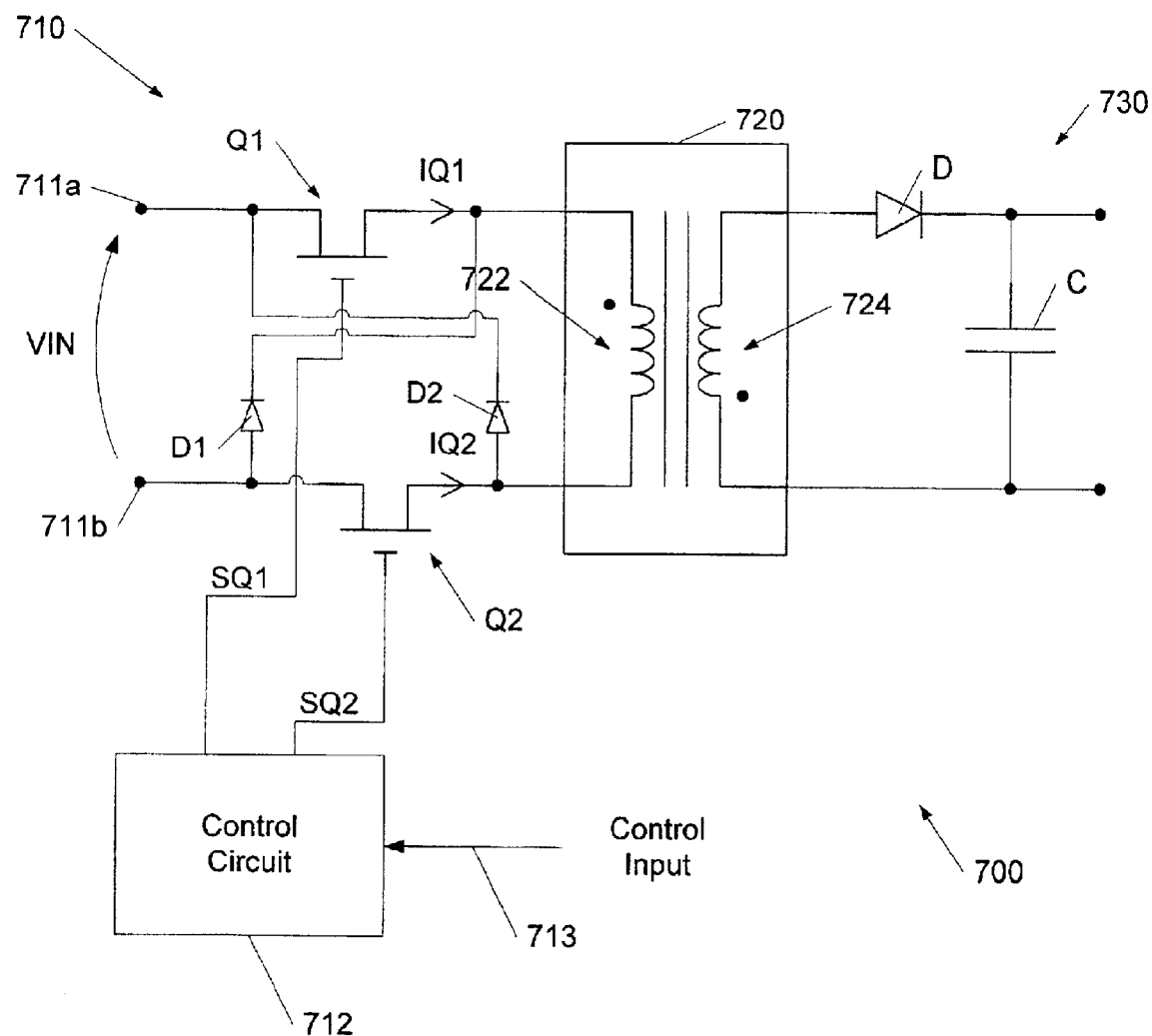
FIG. 7 is a schematic diagram illustrating a flyback converter apparatus according to further embodiments of the invention.
Figure 8:
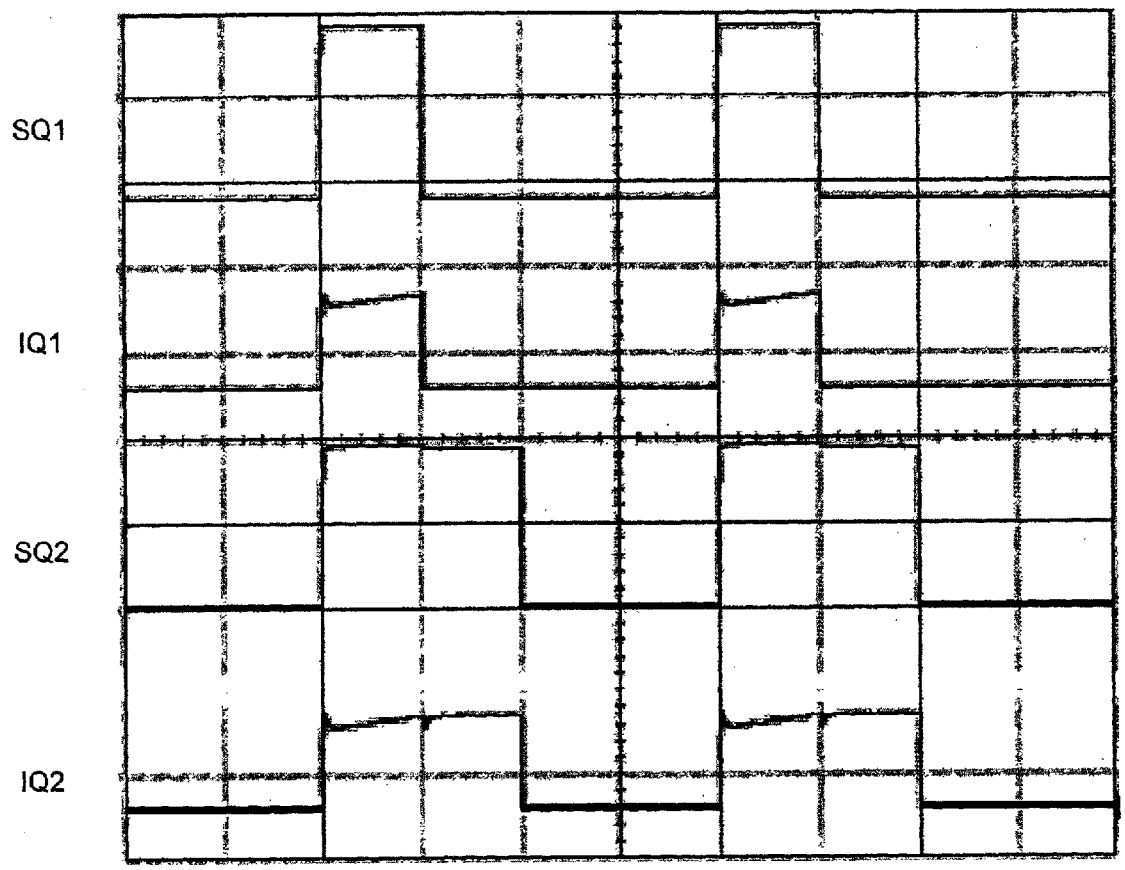
FIGS. 8 and 9 are waveform diagrams illustrating exemplary operations for the apparatus of FIG. 7.
Figure 9:
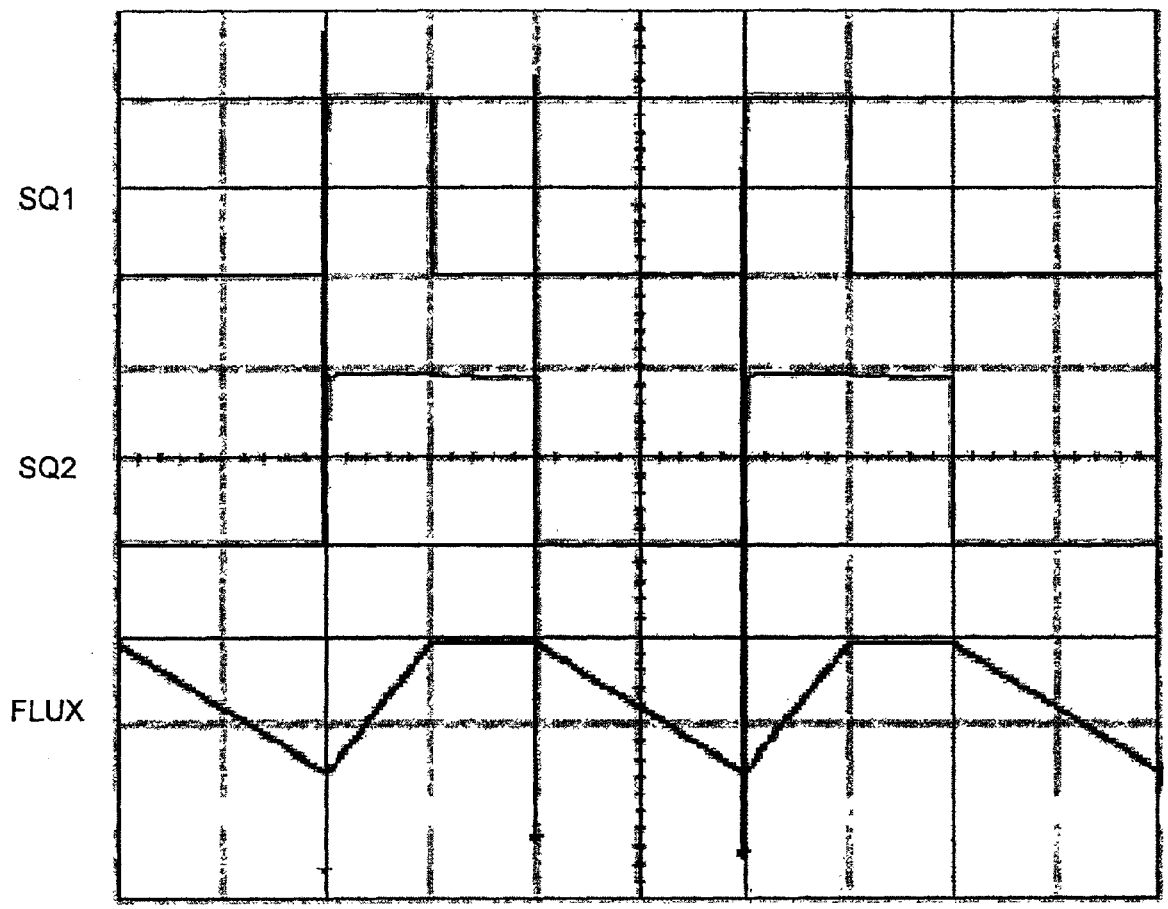

Exemplary operations of the converter apparatus 700 of FIG. 7 will now be described with reference to FIGS. 8 and 9. Referring to FIG. 8, assertion of both of the drive signals SQ1, SQ2 produces currents IQ1, IQ2 as an input voltage VIN at the input port 711a, 711b is applied across the primary winding 722 of the transformer. Referring to FIG. 9, this causes a magnetic flux FLUX in the transformer 720 to ramp up until the drive signal SQ1 is deasserted.

During the interval in which the drive signal SQ1 is deasserted while the drive signal SQ2 remains asserted, the transistor Q2 remains on, short circuiting the primary winding 722 through the diode D1. This causes a current IQ2 through the primary winding 722, keeping the flux FLUX at a constant level. Upon deassertion of the drive signal SQ2, the transistor Q2 turns off and open-circuits the primary winding 722. This causes the flux FLUX to decay as energy is transferred from the primary winding 722, through the secondary winding 724 and on to the output port 731a, 731b.

It will be appreciated that the power converter apparatus 700 is symmetric in that the above-described switching operations can be modified such that functions of the first and second transistors Q1, Q2 are swapped. In particular, instead of turning off the first transistor Q1 after simultaneous assertion of the drive signals SQ1, SQ2, the second transistor Q2 may be turned off while shorting the primary winding 722 via the first transistor Q1 and the diode D2.

Figure 10:
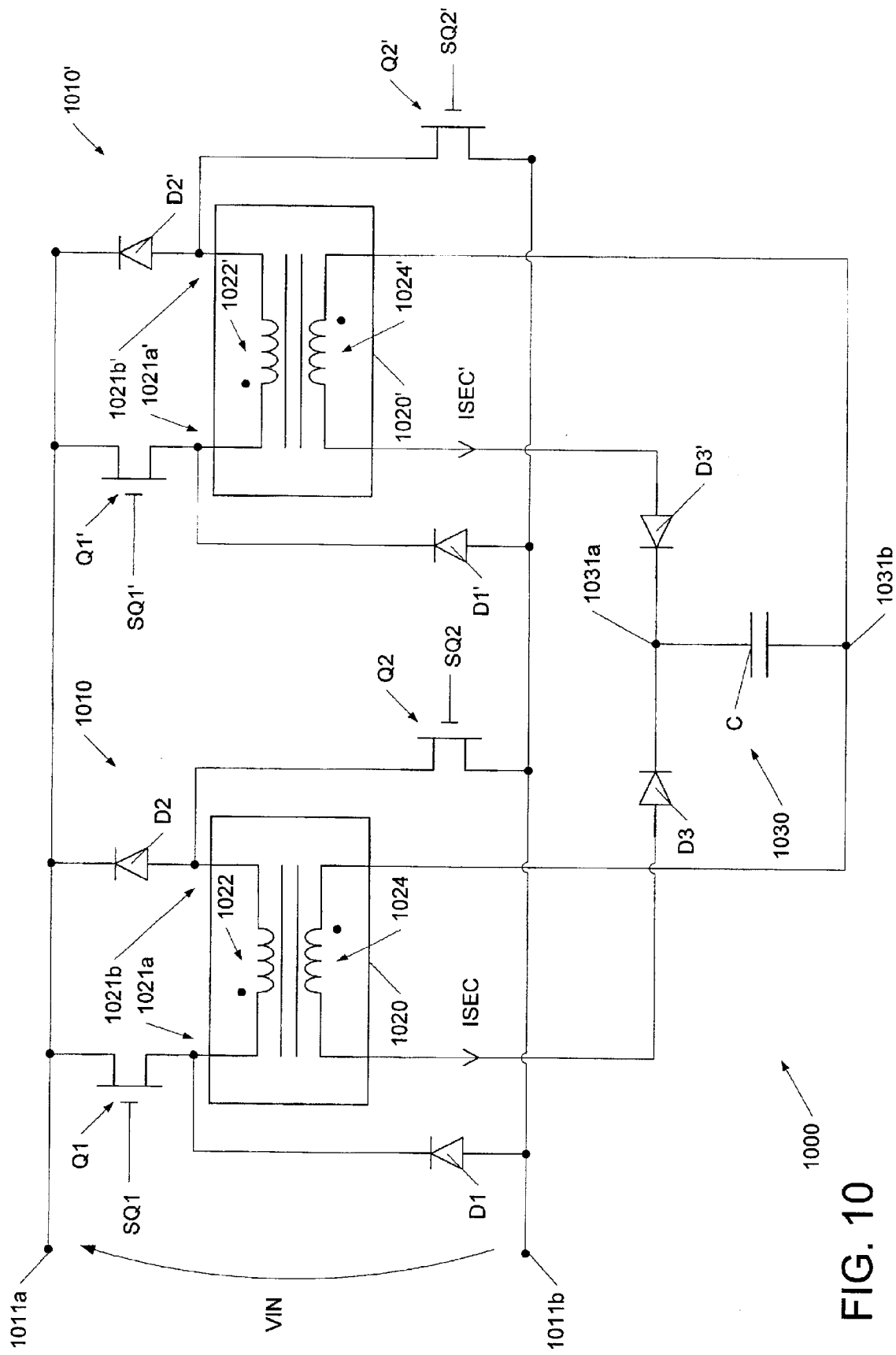
FIG. 10 is a schematic diagram illustrating a multi-phase flyback converter apparatus according to other embodiments of the invention.

FIG. 10 illustrates a two-phase converter apparatus 1000 according to embodiments of the invention that utilize a switching configuration along the lines described above with reference to FIG. 7. A first switching circuit 1010 includes a first transistor Q1 coupled between a first terminal 1011a of an input port 1011a, 1011b and a first terminal 1021a of a primary winding 1022 of a first transformer 1020. A second transistor Q2 is coupled between a second terminal 1011b of the input port 1011a, 1011b and a second terminal 1021b of the primary winding 1022. The first switching circuit 1010 further includes a first diode D1 coupled between the second input terminal 1011b and the first terminal 1021a of the primary winding 1022, and a second diode D2 coupled between the first input terminal 1011a and the second terminal 1021b of the primary winding 1022. The first and second transistors Q1, Q2 operate responsive to drive signals SQ1, SQ2.

A second switching circuit 1010' includes a first transistor Q1' coupled between the first terminal 1011a of the input port 1011a, 1011b and a first terminal 1021a' of a primary winding 1022' of a second transformer 1020', and a second transistor Q2' coupled between the second terminal 1011b of the input port 1011a, 1011b and a second terminal 1021b' of the primary winding 1022'. The second switching circuit 1010' further includes a first diode D1' coupled between the second input terminal 1011b and the first terminal 1021a' of the primary winding 1022', and a second diode D2' coupled between the first input terminal 1011a and the second terminal 1021b of the primary winding 1022. The first and second transistors Q1', Q2' operate responsive to drive signals SQ1', SQ2'.

Secondary windings 1024, 1024' of the first and second transformers 1020, 1020' are coupled to an output port 1031a, 1031b by an output circuit 1030. As shown, the output circuit 1030 includes first and second diodes D3, D3' that control currents ISEC, ISEC' delivered to a capacitor C and/or load at an output port 1031a, 1031b.

Exemplary operations of the converter apparatus 1000 of FIG. 10 will now be explained with reference to FIGS. 11 and 12. In a first interval, the drive signals SQ1, SQ2 are both asserted, turning the transistor Q1 on and applying the input voltage VIN at the input port 1011a, 1011b across the primary winding 1022 of the first transformer 1020. During this time interval, current in the primary winding 1022 and flux FLUX in the first transformer 1020 ramp up as the inductance of the primary winding 1022 is charged. In a succeeding interval, the drive signal SQ1 is deasserted, turning the transistor Q1 off while the second drive signal SQ2 is asserted, causing the primary winding 1022 of the first transformer 1020 to be short-circuited via the diode D1 and causing the flux FLUX to remain constant. In a succeeding interval, both of the drive signals SQ1, SQ2 are deasserted, turning both of the transistors Q1, Q2 off, and creating an open-circuit condition for the primary winding 1022. This causes a current ISEC to flow from the secondary winding 1024 of the first transformer 1020 to the output capacitor C and/or a load (not shown) coupled to the output port 1031a, 1031b. As shown in FIG. 1, the secondary current ISEC gradually decays over the interval until the cycle of operation recommences when the drive signals SQ1, SQ2 are again asserted.

The second switching circuit 1010' is operated in a similar fashion, except that the drive signals SQ1', SQ2' are asserted in a cycle that is shifted approximately 180 degrees with respect to the cycle of the drive signals SQ1, SQ2. As a result, pulses of secondary current ISEC' produced in the secondary winding 1024' of the second transformer 1020' are shifted 180 degrees with respect to pulses of current ISEC produced in the secondary winding 1024 of the first transformer 1020. As such, the combined current delivered to the output port 1031a, 1031b can exhibit relatively low ripple.

Figure 13:
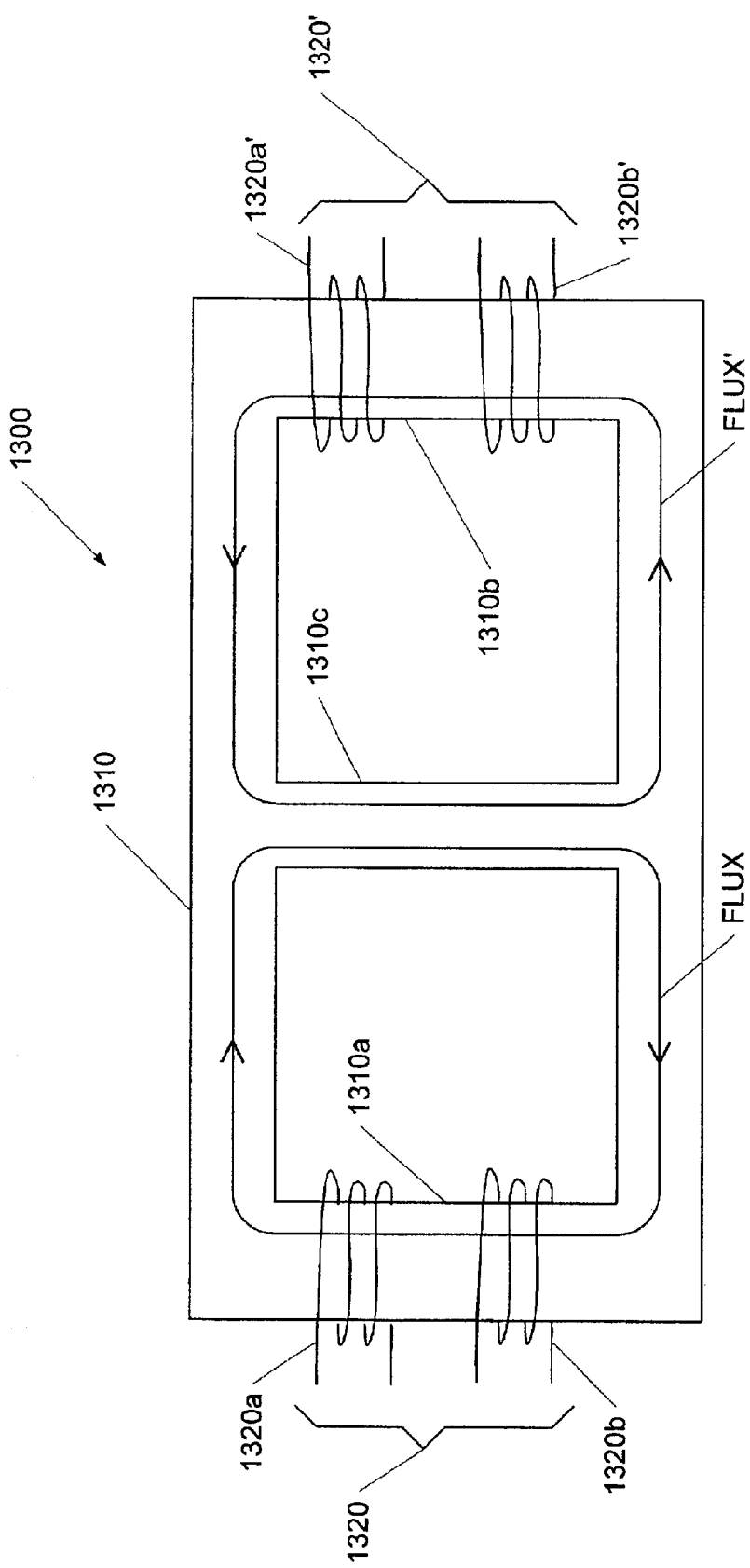
FIG. 13 is a schematic diagram illustrating a transformer core structure for use with the apparatus of FIG. 10.

FIG. 13 illustrates a transformer apparatus 1300 which may be utilized with a two-phase power converter apparatus, such as the apparatus 500 of FIG. 5 and the apparatus 1000 of FIG. 10. The apparatus 1300 includes a core 1310 including three legs 1310a, 1310b, 1310c. A first transformer 1320, e.g., the transformer 1020 of FIG. 10, includes primary and secondary windings 1320a, 1320b wound around the first leg 1310a. A second transformer 1020', e.g., the transformer 1020' of FIG. 10, includes primary and secondary windings 1320a', 1320b' wound around the second leg 1310b. This causes the flux paths FLUX, FLUX' of the first and second transformers 1020, 1020' to overlap in the third leg 1310c.

Figure 14:
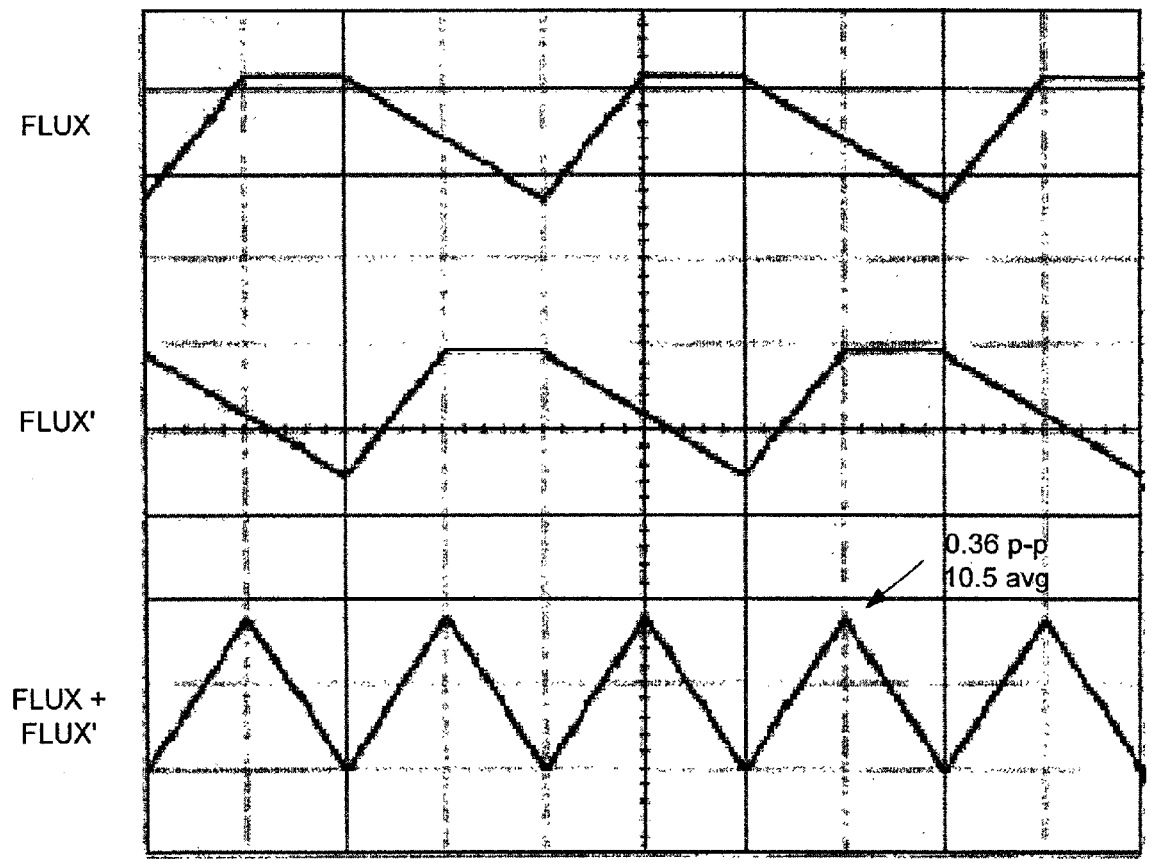
FIGS. 14 and 15 are waveform diagrams illustrating exemplary operations for the apparatus of FIGS. 10 and 13.
Figure 15:
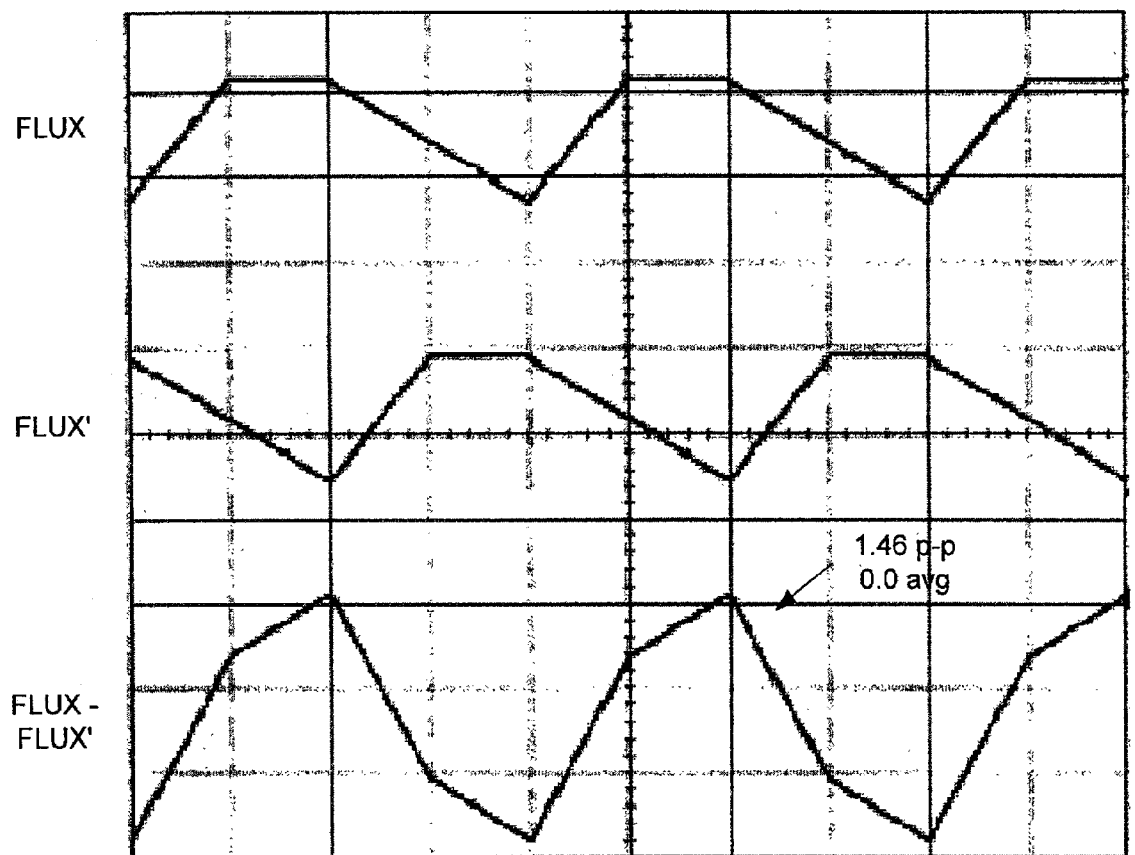

As shown, the transformer windings 1320a, 1320b, 1320a', 1320b' are arranged such that the flux paths FLUX, FLUX' additively overlap. However, it will be appreciated that the windings 1320a, 1320b, 1320a', 1320b' may alternatively be arranged such that the flux paths FLUX, FLUX' subtractively overlap. Additive and subtractive overlap of the flux paths FLUX, FLUX' can provide different characteristics, as illustrated in FIGS. 14 and 15. Referring to FIG. 14, additive overlap of the flux paths FLUX, FLUX' can produce a composite flux FLUX+FLUX' that exhibits a relatively high "DC" bias, but low peak-to-peak variance. In contrast, as shown in FIG. 15, subtractive overlap of the flux paths FLUX, FLUX' can produce a composite flux FLUX−FLUX' that exhibits relatively low DC bias, but relatively large peak-to-peak variance. Such differences in characteristics can, for example, provide additional freedom in design of the core 1310 of the transformer apparatus 1300.

Figure 16:
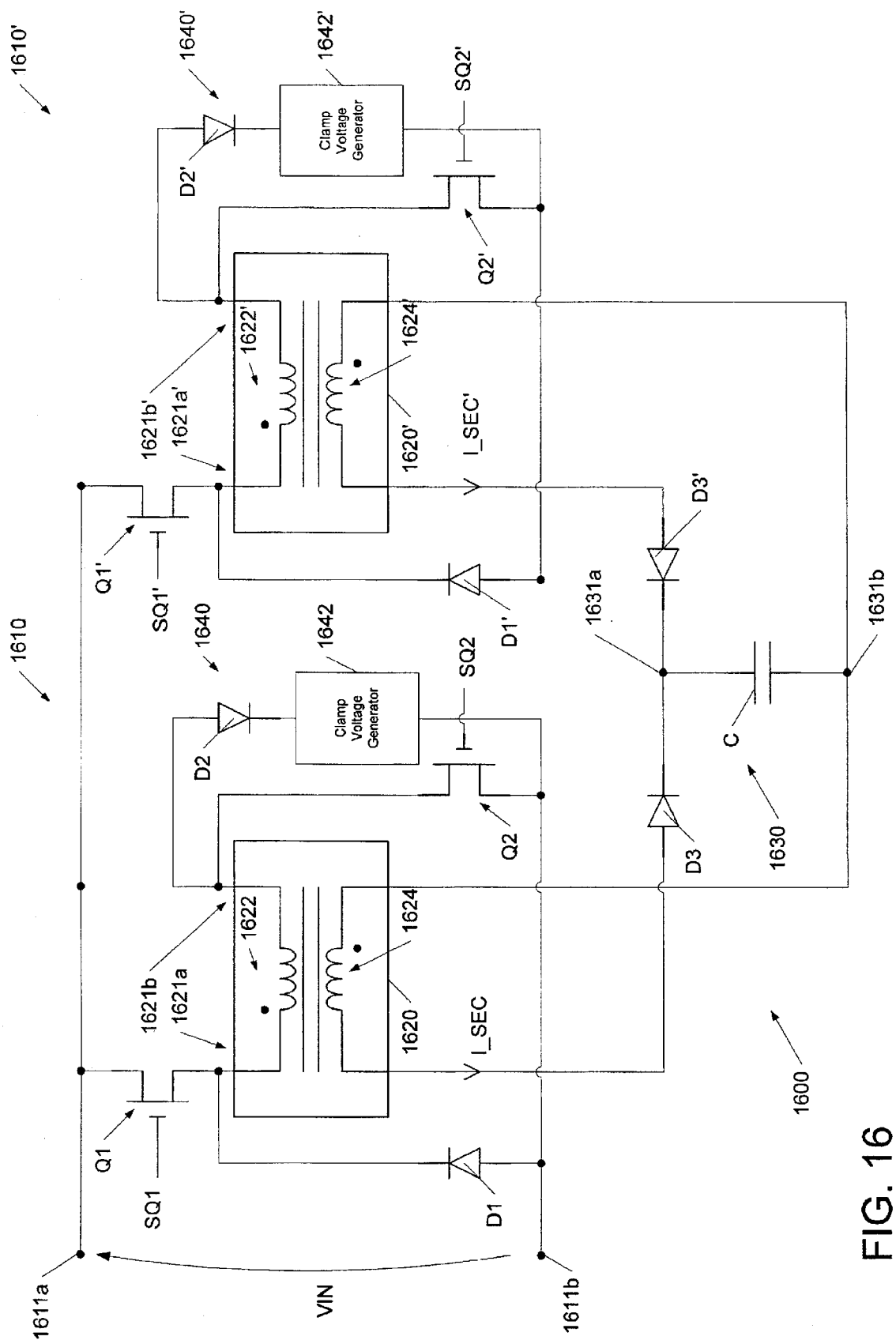
FIG. 16 is a schematic diagram illustrating a multi-phase flyback converter apparatus according to still other embodiments of the invention.

According to other embodiments of the invention, the basic two-phase converter configuration of FIG. 10 may be modified to provide other desirable characteristics. As shown in FIG. 16, a converter apparatus 1600 according to some embodiments of the invention includes a first switching circuit 1610 that includes a first transistor Q1 coupled between a first terminal 1611a of an input port 1611a, 1611b and a first terminal 1621a of a primary winding 1622 of a first transformer 1620, and a second transistor Q2 coupled between a second terminal 1611b of the input port 1611a, 1611b and a second terminal 1621b of the primary winding 1622. The first switching circuit 1610 further includes a first diode D1 coupled between the second input terminal 1611b and the first terminal 1621a of the primary winding 1622, and a clamp circuit 1640 coupled between the second input terminal 1611a and the second terminal 1621b of the primary winding 1622. As shown, the clamp circuit 1640 includes a diode D2 and a clamp voltage generator circuit 1642 that is operative to generate a predetermined voltage at the cathode of the diode D2. The first and second transistors Q1, Q2 operate responsive to drive signals SQ1, SQ2.

A second switching circuit 1610' includes a first transistor Q1' coupled between the first terminal 1611a of the input port 1611a, 1611b and a first terminal 1621a' of a primary winding 1622' of a second transformer 1620', and a second transistor Q2' coupled between the second terminal 1611b of the input port 1611a, 1611b and a second terminal 1621b' of the primary winding 1622'. The second switching circuit 1610' further includes a first diode D1' coupled between the second input terminal 1611b and the first terminal 1621a' of the primary winding 1622', and a clamping circuit 1640' coupled between the second input terminal 1611b' and the second terminal 1621b' of the primary winding 1622'. Similar to the clamp circuit 1640, the clamp circuit 1640' includes a diode D2' and a clamp voltage generator circuit 1642' that is operative to generate a predetermined voltage at the cathode of the diode D2'. The first and second transistors Q1', Q2' operate responsive to drive signals SQ1', SQ2'. Secondary windings 1624, 1624' of the first and second transformers 1620, 1620' are coupled to an output port 1631a, 1631b by an output circuit 1630. As shown, the output circuit 1630 includes first and second diodes D3, D3' that control currents ISEC, ISEC' delivered to a capacitor C and/or a load (not shown) at an output port 1631a, 1631b.

Figure 17:
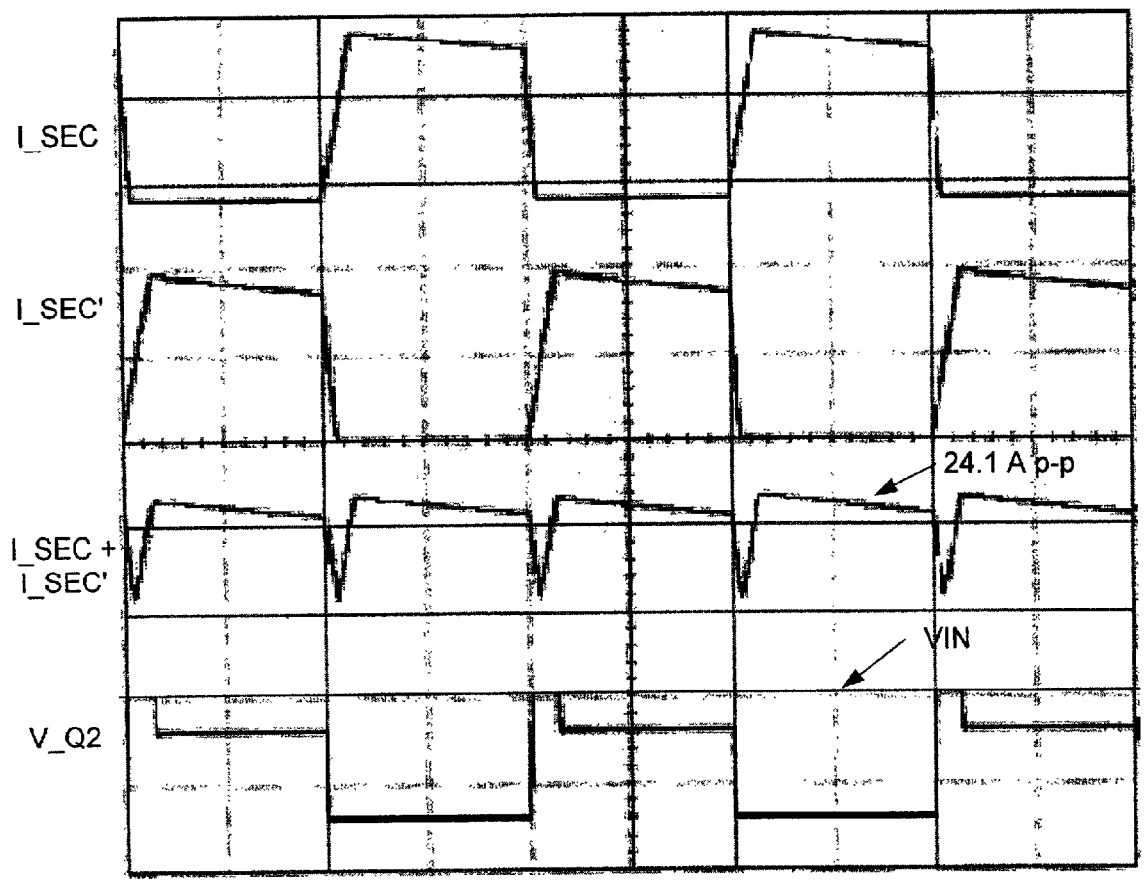
FIGS. 17 and 18 are waveform diagrams illustrating exemplary operations for the apparatus of FIG. 16.
Figure 18:
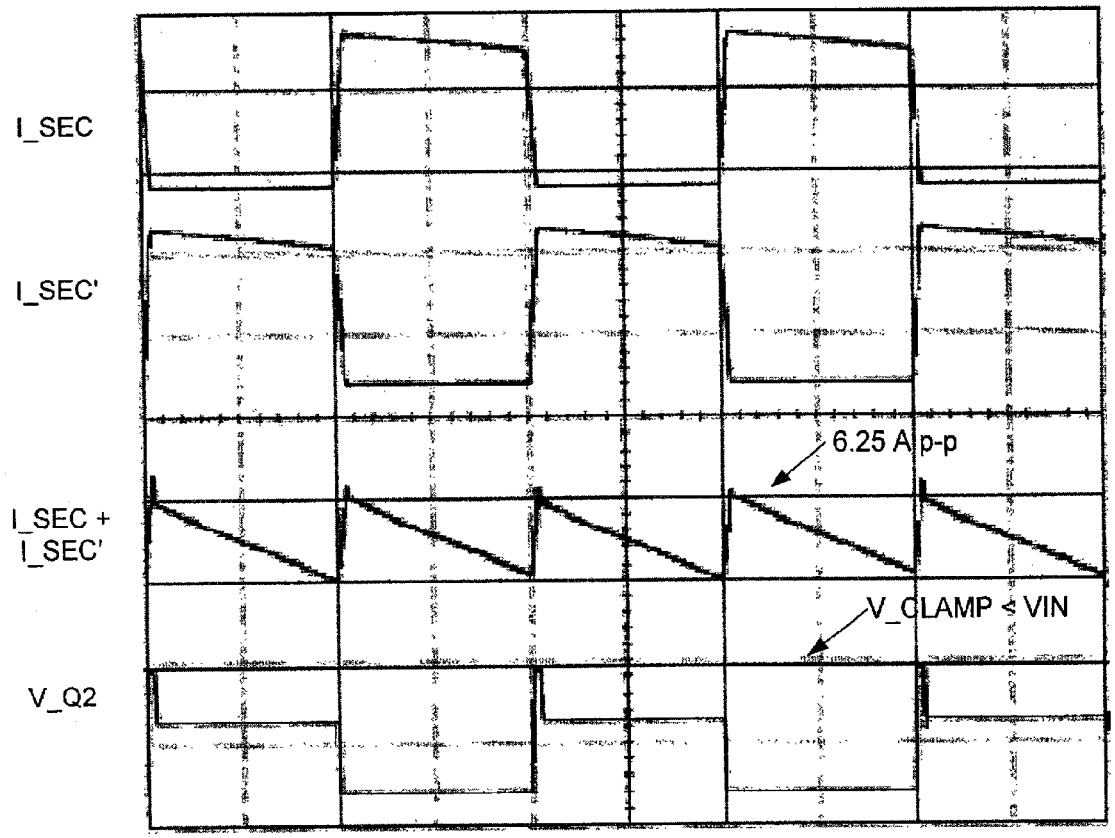

Operational differences between the converter apparatus 1000 of FIG. 10, and the converter apparatus 1600 of FIG. 16 are illustrated by FIGS. 17 and 18. Referring to FIG. 17, which illustrates exemplary operations of a converter configured as in FIG. 10, voltage VQ2 across the transistor Q2 of FIG. 10 is limited to approximately the input voltage VIN applied at the input voltage VIN at the input port 1011a, 1011b due to the clamping action of the diode D1. Consequently, the rise time of the secondary current ISEC may differ significantly from the fall time of the secondary current ISEC'(and vice versa) such that the combined secondary current ISEC+ISEC' produced by the converter 1000 may exhibit relatively large peak-to-peak excursions. In contrast, as shown in FIG. 18, the converter topology of FIG. 16 can produce relatively smaller peak-to-peak excursions in its combined secondary current ISEC+ISEC' due to the fact that the voltages produced across the transistors Q2, Q2' can be controlled by setting the clamp voltage generator circuits 1642, 1642' to approximately equalize the rise time of the current ISEC to the fall time of the current ISEC', and/or to approximately equalize the fall time of the current ISEC to the rise time of the current ISEC'.

Figure 19:
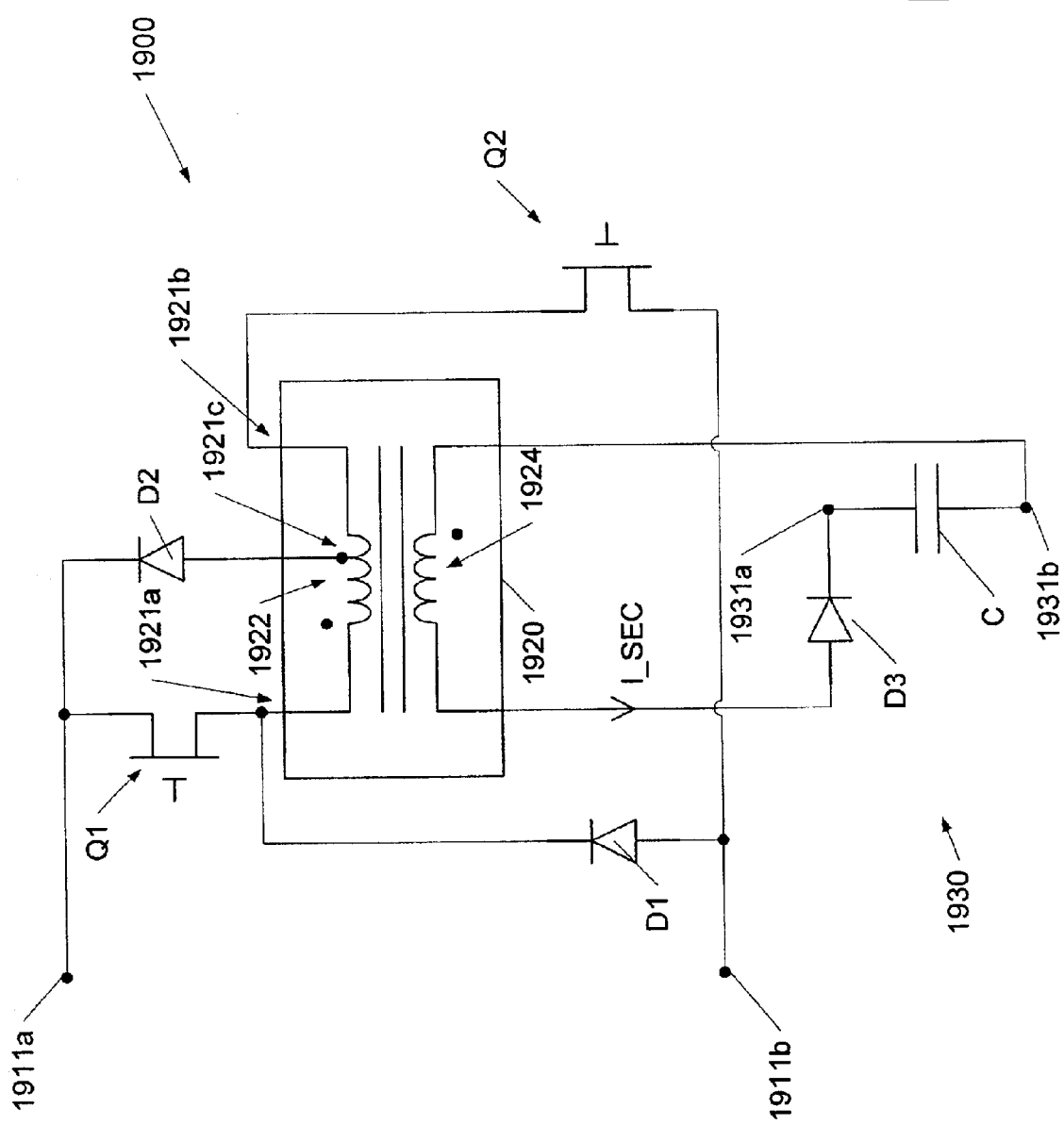
FIG. 19 is a schematic diagram illustrating a flyback converter apparatus according to further embodiments of the invention.

According to embodiments of the invention shown in FIG. 19, a power converter apparatus 1900 includes a switching circuit 1910 including a first transistor Q1 coupled between a first terminal 1911a of an input port 1911a, 1911b and a first terminal 1921a of a primary winding 1922 of a transformer 1920, and a second transistor Q2 coupled between a second terminal 1911b of the input port 1911a, 1911b and a second terminal 1921b of the primary winding 1922. The switching circuit 1910 further includes a first diode D1 coupled between the second input terminal 1911b and the first terminal 1921a of the primary winding 1922. In contrast to the "symmetrical" configuration of the converter apparatus 700 of FIG. 7, the converter apparatus 1900 of FIG. 19 includes a second diode D2 coupled between the first input terminal 1911a and a tap point 1921c between the first and second terminals 1921a, 1921b of the primary winding 1922. The first and second transistors Q1, Q2 operate responsive to drive signals SQ1, SQ2. A secondary winding 1924 of the transformer 1920 is coupled to an output port 1931a, 1931b by an output rectifier circuit 1930 including a diode D3 and a capacitor C.

Referring back to FIGS. 7–9, a potential drawback of the symmetrical configuration of the converter apparatus 700 is that it is generally desirable to limit the "on" duty cycle of transistor Q1 to less than 50% to provide sufficient time t3 for the primary winding 722 to be discharged. However, the connection of the diode D2 of the converter apparatus 1900 to the tap point 1921c of the primary winding 1922 can allow the transistor Q1 of the apparatus 1900 to operate advantageously at a higher duty cycle than 50%, as the diode D2 can accelerate discharge of the primary winding 1922. In particular, a desirable maximum duty cycle DMAX for the transistor Q1 may be given by:

$$DMAX = \frac{N}{N+n}, \qquad (5)$$

wherein N is the number of turns of the primary winding 1922 between the first and second terminals 1921a, 1921b and n is the number of turns of the primary winding between the tap point 1921c and the second terminal 1921b. It will be appreciated that the apparatus 1900 may be paralleled to form a multi-phase converter apparatus, e.g., along the lines of the apparatus 1000, 1600 of FIGS. 10 and 16.

Figure 20:
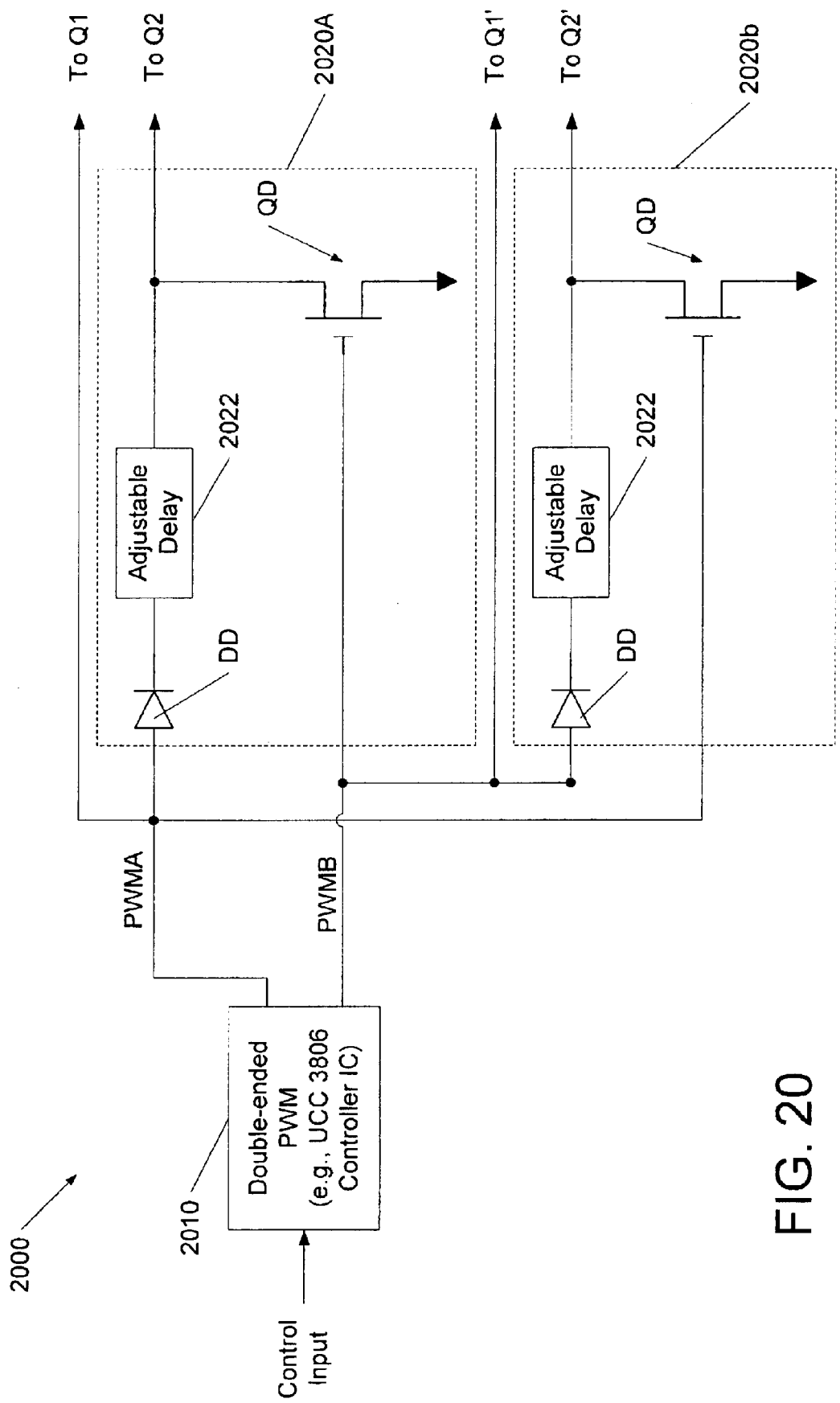
FIG. 20 is a schematic diagram illustrating a control circuit for use in a power converter apparatus according to embodiments of the invention.

According to still other aspects of the invention, two-phase converter structures, such as those illustrated in FIGS. 10 and 16, may lend themselves to a relatively simple structure for control circuits used to drive to the transistors Q1, Q2, Q1', Q2'. As illustrated in FIG. 20, a control circuit 2000 for driving transistors Q1, Q2, Q1', Q2' of a converter apparatus such as the apparatus 1000, 1600 of FIGS. 10 and 16. The control circuit 2000 includes a pulse width modulator (PWM) circuit, here shown as a double-ended PWM circuit 2010 that produces first and second pulse-width modulated control signals PWMA, PWMB that are shifted 180 degrees with respect to one another. Such functionality may be provided, for example, by the UCC 3806 PWM Controller IC produced by Unitrode Corporation, as described in a Data Sheet No. SLUS272A entitled "UCC/1806/12806/3806 Dual Output, Current Mode PWM Controller IC," by Unitrode Corporation (February 2000).

Describing the control circuit 2000 in further detail in the context of an application to the converter apparatus 1000 of FIG. 10, the first and second control signals PWMA, PWMB are provided to respective ones of the transistors Q1, Q1'. Depending on the nature of the transistors Q1, Q1', the intermediate drive circuits (e.g., level shifting circuits) may be required to drive the transistors Q2, Q2'. The first and second drive signals PWMA, PWMB are also provided to respective flip-flop circuits 2020A, 2020B, here shown as including diodes DD, adjustable delay circuits 2020, and transistors QD. The flip-flop circuits 2020A, 2020B provide signals to drive transistors Q2, Q2'. Depending on the nature of the transistors Q2, Q2', the flip-flop circuits 2020A, 2020B may or may not require intermediate drive circuits (e.g., level shifting circuits) to drive the transistors Q2, Q2'.

Operation of the control circuit 2000 will be now be described as applied to the converter apparatus 1000 of FIG. 10. Upon a rising edge of the first control signal PWMA, the transistor Q1 is turned "on." After an interval determined by the adjustable delay circuit 2022, the first flip-flop circuit 2020A is "set," i.e., the transistor Q2 is also turned on, thus causing the input voltage VIN to be applied across the primary winding 1022 of the transformer 1020. When the first control signal PWMA subsequently transitions "low," the transistor Q1 is turned "off," but the transistor Q2 remains on due to the nature of the flip-flop circuit 2020A. Consequently, the primary winding 1022 of the transformer 1022 is short-circuited.

After a time corresponding to a half-cycle of the first control signal PWMA, the second control signal PWMB is asserted high. This causes the first flip-flop circuit 2020A to be "reset" such that transistor Q2 is turned off, open-circuiting the primary winding 1022 of the transformer 1020. Concurrently, the transistor Q1' is turned "on". After an interval determined by the adjustable delay circuit 2022, the second flip-flop circuit 2020B is "set," i.e., the transistor Q2' is also turned on, causing the input voltage VIN to be applied across the primary winding 1022' of the transformer 1020'. When the second control signal PWMB subsequently transitions "low," the transistor Q1 is turned "off," but the transistor Q2' remains on due to the latching characteristic of the flip-flop circuit 2020B. Consequently, the primary winding 1022' of the transformer 1022' is short-circuited.

Figure 11:
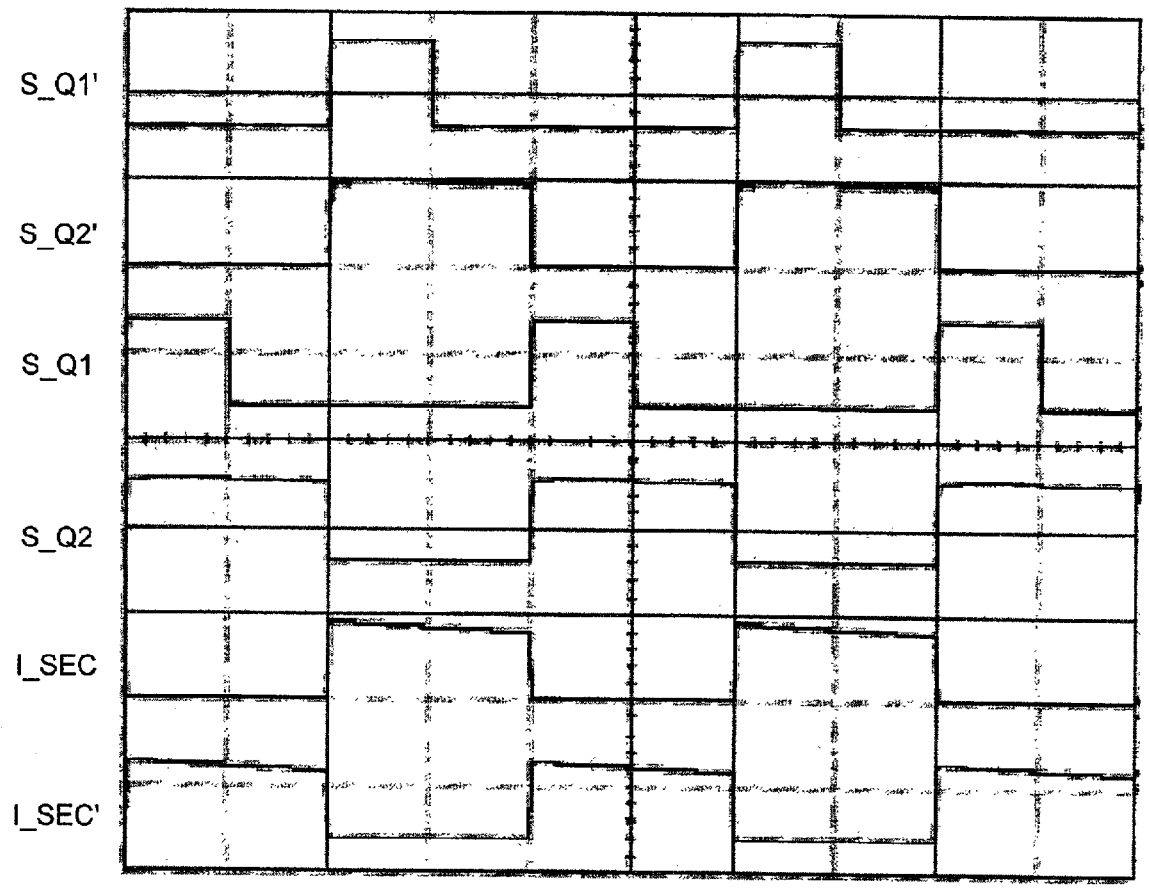
FIGS. 11 and 12 are waveform diagrams illustrating exemplary operations for the apparatus of FIG. 10.
Figure 12:
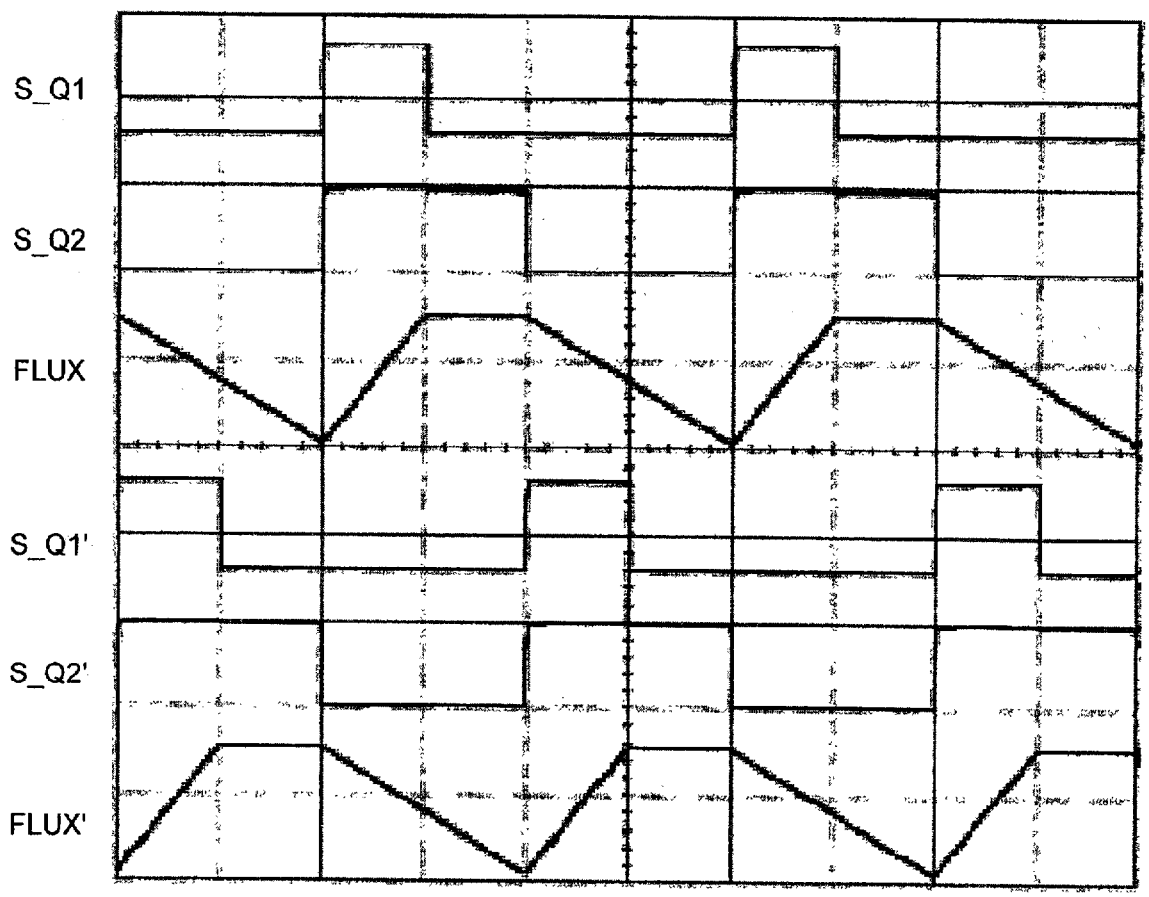

The above-described operations may continue in a cyclical fashion, such that operation similar to that illustrated in FIGS. 11 and 12 is provided. It will be appreciated that the adjustable delay circuits 2022 in the flip-flop circuits 2020A, 2020B may be provided such that timing relationships between secondary currents ISEC, ISEC' can be adjusted to reduce overlap and, therefore, ripple at the output port 1031a, 1031b of the converter 1000. However, it will be understood that the adjustable delay circuits 1022 may be replaced by fixed delays or even eliminated in some applications. It will be further understood that a control circuit along the lines of the control circuit 2000 may similarly be used with a converter apparatus such as the converter apparatus 1600 of FIG. 16.

Figure 21:
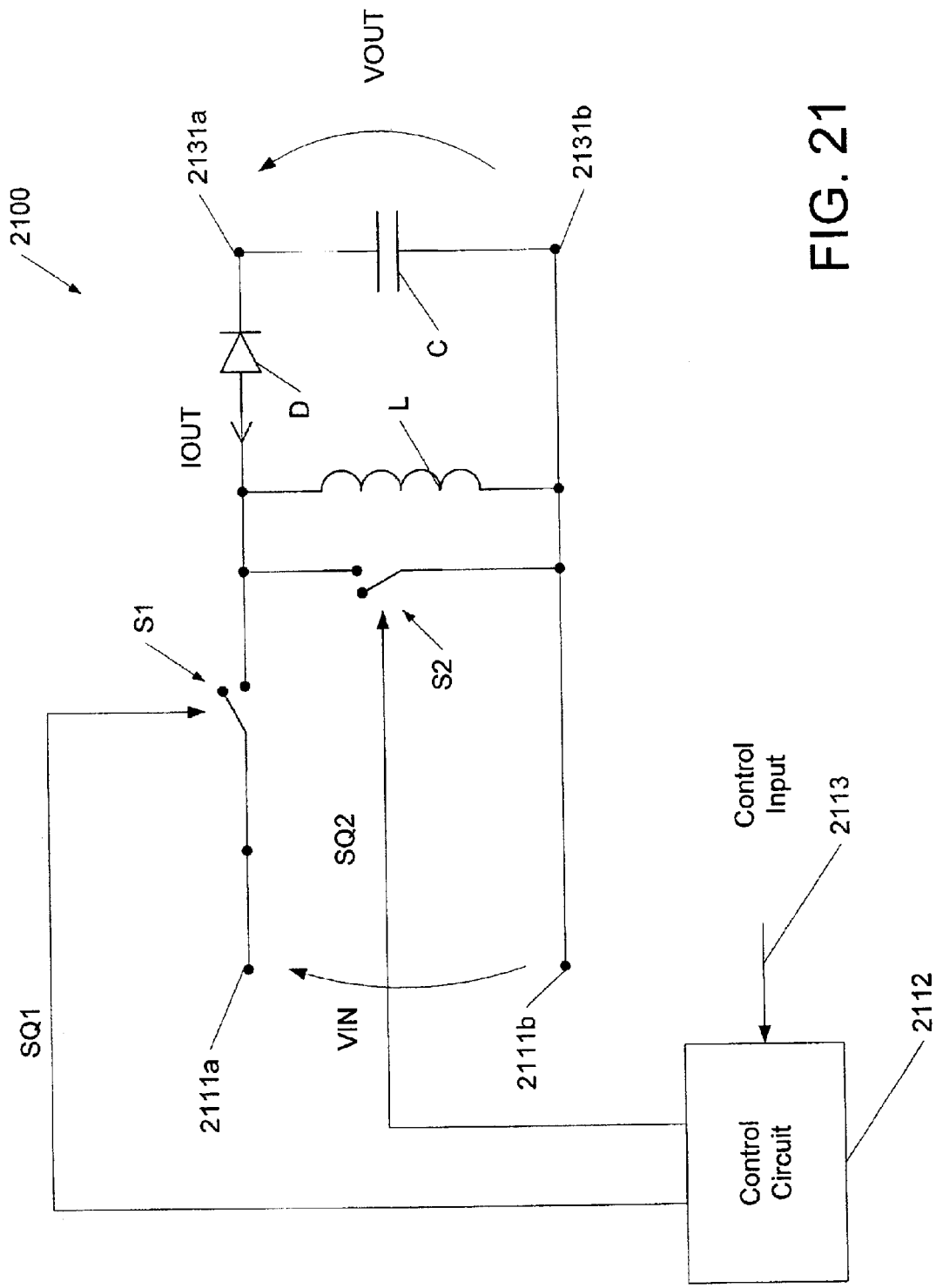
FIG. 21 is a schematic diagram illustrating a non-isolated flyback converter apparatus according to still further embodiments of the invention.

It will be further understood that the invention is more broadly applicable to a wide range of other switching converter configurations, including non-isolated flyback and boost converter configurations. For example, as illustrated in FIG. 21, a non-isolated flyback power converter apparatus 2100 according to further embodiments of the invention includes an inductor L that is coupled to an output port 2131a, 2131b by a rectifier circuit including a diode D and a capacitor C. A switching circuit includes a first switch S1 (e.g., a transistor or other switching device) operative to connect the inductor L in series with an input port 2111a, 2111b at which at voltage VIN is applied. A second switch S2 (e.g. a transistor or other switching device) is operative to short circuit the inductor L. The first and second switches S1, S2 operate responsive to respective control signals SQ1, SQ2 generated by a control circuit 2112 responsive to a control input 2113. As with the other converter configurations described above, the apparatus 2100 can be paralleled to create a multi-phase converter apparatus.

Figure 22:
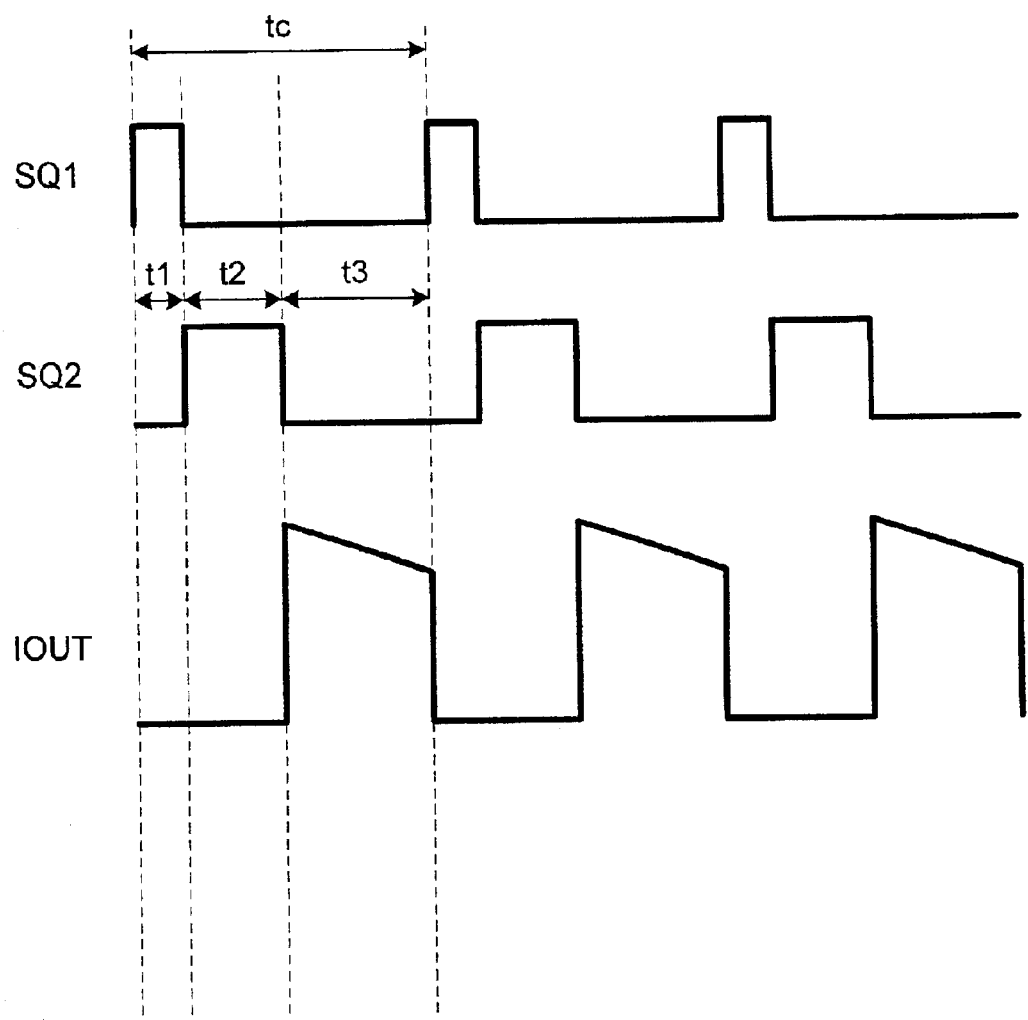
FIG. 22 is a waveform diagram illustrating exemplary operations of the apparatus of FIG. 21.

Exemplary operations of the apparatus 2100 of FIG. 21 according to embodiments of the invention will now be described with reference to FIG. 22. For a first time interval t1, the drive signal SQ1 is asserted, turning on the first switch S1 and applying the input voltage VIN across the inductor L. During this time interval t1, current in the inductor L ramps up as the inductor L is charged. In a succeeding interval t2, the first drive signal SQ1 is deasserted, turning the first switch S1 off, while the second drive signal SQ2 is asserted, turning on the second switch S2 and short circuiting the inductor L such that the voltage across the inductor L is held near zero volts. In a succeeding interval t3, both of the drive signals SQ1, SQ2 are deasserted, turning both of the switches S1, S2 off. This causes a negative voltage to be developed across the inductor L such that the diode D becomes forward biased. This allows a current IOUT to flow from the inductor L to the output capacitor C and/or a load (not shown) coupled to the output port 2131a, 2131b, producing a voltage VOUT at the output port 2131a, 2131b. The current IOUT gradually decays over the interval t3 until the cycle of operation recommences when the first drive signal SQ1 is again reasserted, causing the current IOUT to again drop to zero. The intervals t1, t2, t3 may be cyclically repeated, such that the current IOUT is pulsed as shown in FIG. 22. Similar to the operations described above with reference to FIGS. 3 and 4, the "charging" and "short circuit" intervals t1, t2 can be reversed.

For the converter apparatus 2100 of FIG. 21, assuming continuous conduction mode operation, the output voltage VOUT may be given by:

$$VOUT = -VIN * \frac{t1}{t3}, \qquad (6)$$

or $$VOUT = -VIN * \frac{D1}{D2}, \qquad (7)$$

where $$D1 = \frac{t1}{tc}, \quad (8)$$

and $$D2 = \frac{t3}{tc}. \quad (9)$$

Figure 23:
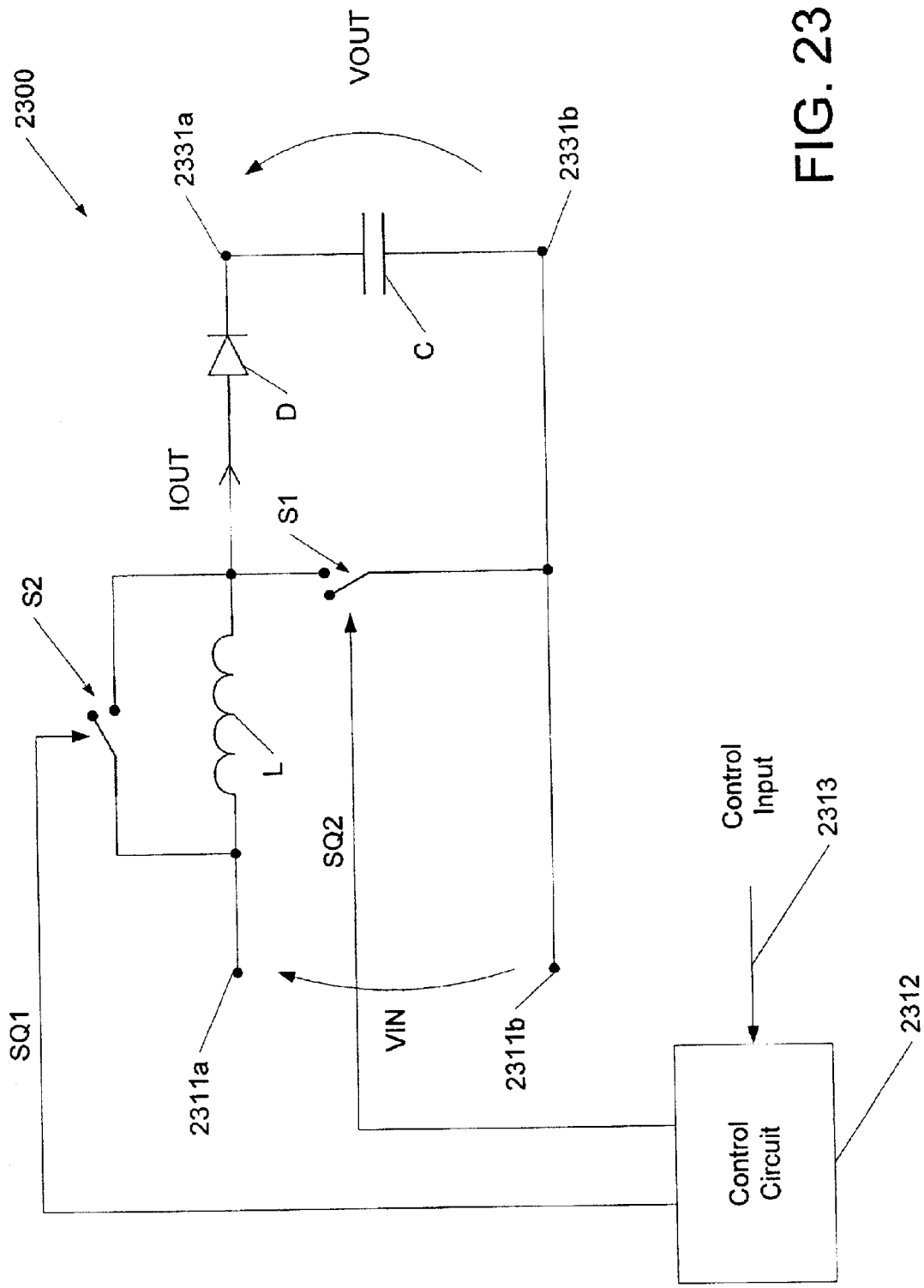
FIG. 23 is a schematic diagram illustrating a boost converter apparatus according to embodiments of the invention.

As illustrated in FIG. 23, a boost converter apparatus 2300 apparatus according to still other embodiments of the invention includes a switching circuit comprising a first switch S1 that is operative to connect an inductor L in series with an input port 2311a, 2311b at which a voltage VIN is applied. A second switch S2 is operative to short-circuit the inductor L. The first and second switches S1, S2 operate responsive to respective control signals SQ1, SQ2 generated by a control circuit 2312 responsive to a control input 2313.

Figure 24:
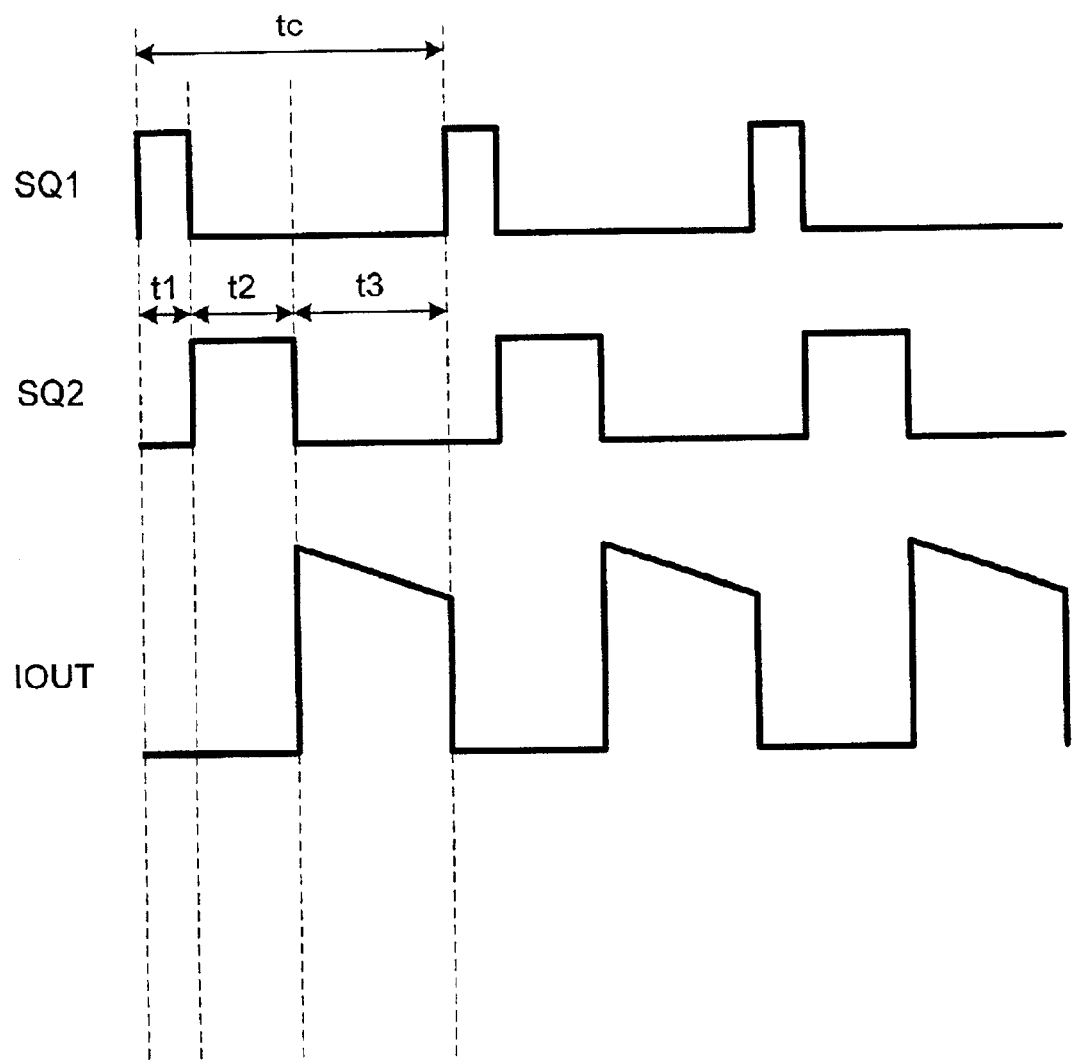
FIG. 24 is a waveform diagram illustration exemplary operations of the apparatus of FIG. 23.

Exemplary operations of the apparatus 2300 of FIG. 23 according to embodiments of the invention will now be described with reference to FIG. 24. For a first time interval t1, the drive signal SQ1 is asserted, turning on the first switch S1 and applying the input voltage VIN across the inductor L. During this time interval t1, current in the inductor L ramps up. In a succeeding interval t2, the first drive signal SQ1 is deasserted, turning the first switch S1 off, while the second drive signal SQ2 is asserted, turning on the second switch S2 and short circuiting the inductor L such that the voltage across the inductor L is held near zero volts. In a succeeding interval t3, both of the drive signals SQ1, SQ2 are deasserted, turning both of the switches S1, S2 off. This causes the diode D to become forward biased, causing a pulse in the current IOUT from the inductor L to the output capacitor C and/or a load (not shown) coupled to the output port 2331a, 2331b that increases the output voltage VOUT. The current IOUT gradually decreases over the interval t3 until the cycle of operation recommences when the first drive signal SQ1 is again reasserted. The intervals t1, t2, t3 may be cyclically repeated, such that the current IOUT is pulsed as shown in FIG. 24. Similar to the operations described above with reference to FIGS. 3 and 4, the "charging" and "short circuit" intervals t1, t2 can be reversed.

For the converter apparatus 2300 of FIG. 23, assuming continuous conduction mode operation, the output voltage VOUT may be given by:

$$VOUT = VIN\left(1 + \frac{t1}{t3}\right), \quad (10)$$

or $$VOUT = VIN\left(1 + \frac{D1}{D2}\right) \quad (11)$$

where $$D1 = \frac{t1}{tc}, \quad (12)$$

and $$D2 = \frac{t3}{tc}. \quad (13)$$

Figure 25:
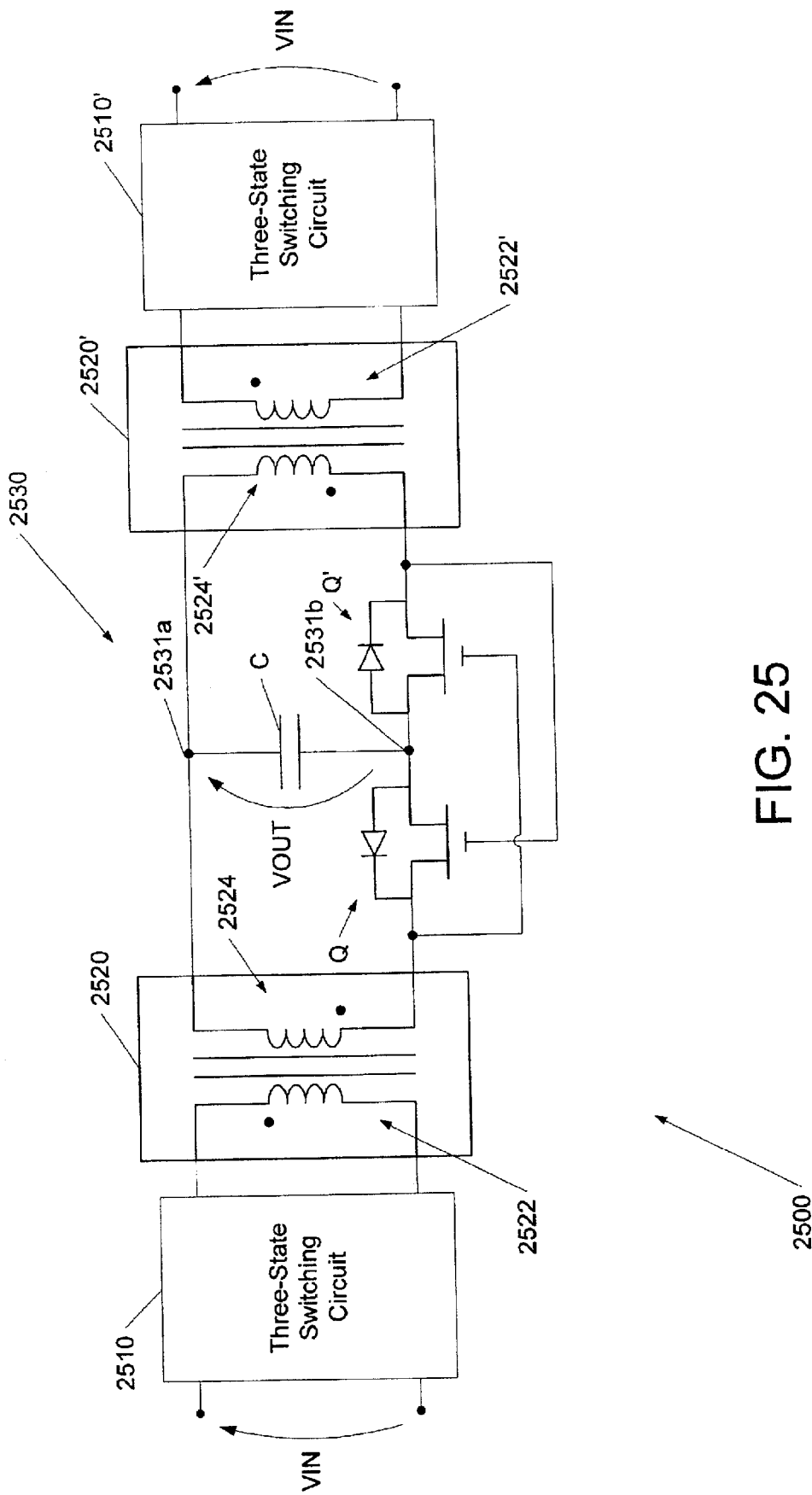
FIG. 25 is a schematic diagram illustrating a power converter apparatus with self-driven synchronous output rectification according to still other embodiments of the invention.

According to still other aspects of the invention, power conversion cycle including a short-circuited "holding" state as described herein may be advantageously used in a multi-phase arrangement using self-driven synchronous output rectification. For example, as shown in FIG. 25, a multi-phase power converter apparatus 2500 may include first and second switching circuits 2510, 2510', e.g., switching circuits along the lines described above with reference to FIGS. 1, 2, 5, 7, 10, 16 and 19, that are coupled to respective primary windings 2522, 2522' of respective first and second transformers 2520, 2520'. Secondary windings 2524, 2524' of the transformers 2520, 2520' are connected to an output circuit 2530 including cross-connected transistors Q, Q' and a storage capacitor C. If the switching circuits 2510, 2510' are operated along the lines illustrated with reference to FIGS. 6, 8, 9, 11, and 12, in particular, such that the switching circuits 2510, 2510' repetitively perform complementary power conversion cycles, each of which include a "charging" state, a "short circuit," and an "open circuit" state, complementary voltages VQ, VQ' may be generated across the transistors Q, Q'. Accordingly, the transistors Q, Q' turn on and off in a complementary fashion, providing self-driven synchronous rectification of voltages produced across the secondary windings 2522, 2522' to produce an output voltage VOUT at the output port 2531a, 2531b of the apparatus 2500.

Such an approach may be particularly advantageous over conventional converter designs. In particular, synchronous output rectification may be highly desirable due to its potential to provide low conduction losses and/or other benefits. However, self-driven synchronous output rectification along the lines illustrated in FIG. 25 may be problematic in conventional converter configurations. For example, conventional flyback converters are commonly constrained to regulate output voltage by varying relative intervals during which the flyback inductance is "charged" and "discharged." Consequently, it may be difficult to provide self-driven synchronous rectification, such as that illustrated in FIG. 25, in a conventional multi-phase flyback converter configuration. However, converters according to embodiments of the invention can provide an additional degree of freedom due to inclusion of a short-circuited "holding" state in their power conversion cycle and, thus, can regulate output voltage by modulating "charging" intervals with respect to "short circuit" intervals. Consequently, complementary operation of parallel-connected converters according to embodiments of the invention can be achieved while providing output voltage regulation. This complementary operation can allow self-driven synchronous output rectification, such as that illustrated in FIG. 25, to be used. It will be appreciated that such self-driven synchronous output rectification may be used for a variety of embodiments of the invention, including, but not limited to, isolated and non-isolated flyback converter configurations, boost converter configurations, and buck converter configurations.

In the drawings and foregoing description thereof, there have been disclosed typical embodiments of the invention. Terms employed in the description are used in a generic and descriptive sense and not for purposes of limitation, the scope of the invention being set forth in the following claims.

That which is claimed is:

1. A power converter apparatus comprising:
an input port;
an output port;
a first inductor coupled to the output port;
a first switching circuit coupled to the input port and the first inductor, the first switching circuit operative to repetitively perform a cycle comprising a first state in which the first switching circuit couples the first inductor to the input port such that energy is transferred from the input port to the first inductor, a second state in which the first switching circuit short circuits the first inductor, and a third state in which the first switching circuit decouples the first inductor such that energy is transferred from the first inductor to the output port;
a second inductor coupled to the output port; and
a second switching circuit coupled to the input port and the second inductor, the second switching circuit operative to repetitively perform a cycle comprising a first state in which the second switching circuit couples the second inductor to the input port such that energy is transferred from the input port to the second inductor, a second state in which the second switching circuit short circuits the second inductor, and a third state in which the second switching circuit decouples the second inductor such that energy is transferred from the second inductor to the output port.

2. An apparatus according to claim 1, wherein the first and second switching circuits are operative to vary durations in which the first and second switching circuits are in their respective second states responsive to a control input.

3. An apparatus according to claim 2, wherein the first and second switching circuits are operative to vary respective durations in which the first and second switching circuits are in their respective first, second and third states responsive to a control input.

4. An apparatus according to claim 1, wherein the first switching circuit comprises:
a first switch operative to connect the inductor in series with the input port;
a second switch operative to short circuit the inductor; and
a control circuit operative to control the first and second switches responsive to a control input.

5. An apparatus according to claim 4, wherein the control circuit is operative to control the first and second switches responsive to respective first and second control inputs.

6. An apparatus according to claim 4, wherein the control circuit is operative to independently control the first and second switches.

7. An apparatus according to claim 1, wherein the first and second inductors are magnetically coupled to the output port.

8. An apparatus according to claim 7, wherein the first inductor comprises a primary winding of a first transformer, wherein the second inductor comprises a primary winding of a second transformer, wherein secondary windings of the first and second transformers are coupled to the output port, and wherein the first and second switching circuits are operative to cause energy to be transferred from respective ones of the primary windings of the first and second transformers to the output port via the respective secondary windings of the first and second transformers when the first and second switching circuit are in their respective third states.

9. An apparatus according to claim 8, wherein the apparatus comprises a rectifier circuit coupled to the secondary windings of the first and second transformers and operative to transfer energy to the output port from the secondary windings as the first and second switching circuits cyclically operate.

10. An apparatus according to claim 1, wherein the first and second inductors are coupled to the output port through at least one rectifier circuit.

11. An apparatus according to claim 1, wherein the first and second inductors are coupled to the output port by an output circuit operative to provide a current path from the first and second inductors to the output port responsive to the first and second switching circuits transitioning to their respective third states.

12. An apparatus according to claim 11, wherein the output circuit comprises a rectifier circuit.

13. An apparatus according to claim 1, wherein the second switching circuit operates such that the first and second states of the second switching circuit substantially coincide with the third state of the first switching circuit.

14. A power converter apparatus, comprising:
an input port;
an output port;
a first transformer having a primary winding and a secondary winding;
a first switching circuit coupled to the input port and the primary winding of the first transformer, the first switching circuit operative to repetitively perform a cycle comprising a first state in which the first switching circuit couples the input port to first and second terminals of the primary winding of the first transformer, a second state in which the first switching circuit couples the first terminal of the primary winding of the first transformer to the second terminal of the primary winding of the first transformer, and a third state in which the first switching circuit decouples at least one of the first and second terminals of the primary winding of the first transformer from the input port while decoupling the first and second terminals of the primary winding of the first transformer from one another;
a second transformer having a primary winding and a second winding;
a second switching circuit coupled to the input port and the primary winding of the second transformer, the second switching circuit operative to cyclically transition through a first state in which the second switching circuit couples the input port to first and second terminals of the primary winding of the second transformer, a second state in which the second switching circuit couples the first terminal of the primary winding of the second transformer to the second terminal of the primary winding of the second transformer, and a third state in which the switching circuit decouples at least one of the first and second terminals of the primary winding of the second transformer from the input port while decoupling the first and second terminals of the primary winding of the second transformer from one another; and
an output circuit coupled to the secondary windings of the first and second transformers and operative to transfer energy to the output port from the secondary windings of the first and second transformers as the first and second switching circuits cyclically operate.

15. An apparatus according to claim 14, wherein the first switching circuit operates in successive cycles, each of which comprises the first state, the second state and the third state in succession.

16. An apparatus according to claim 14, wherein the first switching circuit operates in successive cycles, each of which comprises the second state, the first state and the third state in succession.

17. An apparatus according to claim 14, wherein the second switching circuit operates such that the first and second states of the second switching circuit substantially coincide with the third state of the first switching circuit.

18. An apparatus according to claim 17, wherein the first and second transformers have overlapping flux paths.

19. An apparatus according to claim 18, wherein the flux paths of the first and second transformers additively overlap.

20. An apparatus according to claim 18, wherein the flux paths of the first and second transformers subtractively overlap.

21. An apparatus according to claim 18, wherein the primary and secondary windings of the first transformer are wound on a first leg of a core, wherein the primary and secondary windings of the second transformer are wound on a second leg of the core, and wherein the core comprises a third leg that supports the overlapping flux paths of the first and second transformers.

22. An apparatus according to claim 14:
wherein the first switching circuit comprises:
a first switch operative to couple and decouple a first terminal of the input port to and from the first terminal of the primary winding of the first transformer; and
a second switch operative to couple and decouple a second terminal of the input port to and from the second terminal of the primary winding of the first transformer;
wherein the second switching circuit comprises:
a third switch operative to couple and decouple a first terminal of the input port to and from the first terminal of the primary winding of the second transformer;
a fourth switch operative to couple and decouple second terminal of the input port to and from the second terminal of the primary winding of the second transformer; and
wherein the apparatus further comprises a control circuit comprising:
a pulse width modulator circuit operative to produce first and second control signals that are pulse-width modulated responsive to a control input and that are phase-shifted one-half cycle with respect to one another;
a first flip-flop circuit operative to generate a third control signal such that the third control signal is set by the first control signal and reset by the second control signal; and
a second flip-flop circuit operative to generate a fourth control signal such that the fourth control signal is set by the second control signal and reset by the first control signal; and
wherein the first switch operates responsive to the first control signal, the second switch operates responsive to the third control signal, the third switch operates responsive to the second control signal, and the fourth switch operates responsive to the fourth control signal.

23. An apparatus according to claim 22:
wherein the pulse width modulator circuit produces the first and second control signals at respective first and second output terminals thereof;
wherein the first switch is coupled to the first output of the pulse width modulator circuit;
wherein the third switch is coupled to the second output of the pulse width modulator circuit;
wherein the first flip-flop circuit comprises a first transistor having a controlled electrode coupled to the second switch and to the first output of the pulse width modulator circuit and a controlling electrode coupled to the second output of the pulse width modulator circuit; and
wherein the second flip-flop circuit comprises a second transistor having a controlled electrode coupled to the fourth switch and to the second output of the pulse width modulator circuit and a controlling electrode coupled to the first output of the pulse width modulator circuit.

24. An apparatus according to claim 23, wherein the control circuit further comprises:
a first delay circuit that couples the controlled electrode of the first transistor to the first output of the pulse width modulator circuit; and
a second delay circuit that couples the controlled electrode of the second transistor to the second output of the pulse width modulator circuit.

25. An apparatus according to claim 24, wherein the first and second delay circuits are adjustable.

26. An apparatus according to claim 14, wherein the output circuit comprises a rectifier circuit that produces a DC voltage at the output port from AC voltages generated on the secondary windings of the first and second transformers by the cyclical operation of the first and second switching circuits.

27. An apparatus according to claim 26, wherein the rectifier circuit comprises a self-driven rectifier circuit.

28. An apparatus according to claim 27, wherein the self-driven rectifier circuit comprises:
a first transistor coupled between the secondary winding of the first transformer and the output port;
a second transistor coupled between the secondary winding of the second transformer and the output port; and
wherein a control electrode of the first transistor is coupled to a terminal of the secondary winding of the second transformer, and wherein a control electrode of the second transistor is coupled to a terminal of the secondary winding of the first transformer, such that the first and second transistors operate in a complementary fashion.

29. A method of operating a power converter, the method comprising:
repeatedly performing a first power conversion cycle comprising:
applying a voltage across first and second terminals of a primary winding of a first transformer;
coupling the first and second terminals of the primary winding of the first transformer to one another; and
decoupling the first and second terminals of the primary winding of the first transformer to induce a current pulse in a secondary winding of the first transformer; and
repeatedly performing a second power conversion cycle comprising:
applying a voltage across first and second terminals of a primary winding of a second transformer;
coupling the first and second terminals of the primary winding of the second transformer to one another; and
decoupling the first and second terminals of the primary winding of the second transformer to induce a current pulse in a secondary winding of the second transformer.

30. A method according to claim 29, wherein the step of applying a voltage across first and second terminals of a primary winding of a first transformer precedes the step of coupling the first and second terminals of the primary winding of the first transformer to one another.

31. A method according to claim 29, wherein the step of applying a voltage across first and second terminals of a primary winding of a first transformer follows the step of coupling the first and second terminals of the primary winding of the first transformer to one another.

32. A method according claim 29, further comprising generating a DC voltage from the induced current pulses.

33. A method according to claim 32, further comprising varying respective time intervals for which a voltage is applied across first and second terminals of the primary windings and for which the first and second terminals of the primary windings are coupled to one another to control the DC voltage.

34. A method according to claim 29, wherein repeatedly performing a second power conversion cycle comprises synchronizing performance of the second power conversion cycle with respect to performance of the first power conversion cycle such that the step of decoupling the first and second terminals of the primary winding of the first transformer from one another occurs concurrently with the steps of applying a voltage across first and second terminals of the primary winding of the second transformer and coupling the first and second terminals of the primary winding of the second transformer to one another.

35. A method according to claim 34, further comprising:
combining first and second currents generated in the secondary windings of the first and second transformers; and
delivering the combined currents to a load to produce a DC voltage.

* * * * *